US00RE49858E

(19) United States
(12) Reissued Patent
Yamada et al.

(10) Patent Number: US RE49,858 E
(45) Date of Reissued Patent: Mar. 5, 2024

(54) REAR PART STRUCTURE OF VEHICLE

(71) Applicant: HONDA MOTOR CO., LTD., Tokyo (JP)

(72) Inventors: Kazuhiko Yamada, Saitama (JP); Tomofumi Ichinose, Saitama (JP); Yoshinori Gotoh, Saitama (JP)

(73) Assignee: Honda Motor Co., Ltd., Tokyo (JP)

(21) Appl. No.: 17/211,578

(22) Filed: Mar. 24, 2021

Related U.S. Patent Documents

Reissue of:
(64) Patent No.: 7,021,698
Issued: Apr. 4, 2006
Appl. No.: 10/932,572
Filed: Sep. 2, 2004

(30) Foreign Application Priority Data

Sep. 2, 2003 (JP) ..... 2003-309484
Sep. 2, 2003 (JP) ..... 2003-309919

(51) Int. Cl.
*B60J 5/10* (2006.01)
*E05D 5/02* (2006.01)
(Continued)

(52) U.S. Cl.
CPC ..... *B60J 5/101* (2013.01); *B60J 5/107* (2013.01); *E05D 5/0207* (2013.01); *E05D 5/062* (2013.01);
(Continued)

(58) Field of Classification Search
CPC ..... B60J 5/101; B60J 5/107; E05D 5/0207; E05D 5/062; E05D 7/04; E05D 7/121;
(Continued)

(56) References Cited

U.S. PATENT DOCUMENTS 4,165,897 A * 8/1979 Schmidt ..... 296/56
4,620,743 A * 11/1986 Eke ..... 296/146.8
(Continued)

FOREIGN PATENT DOCUMENTS

CN 1434187 A 8/2003
EP 0196968 A1 10/1986
(Continued)

OTHER PUBLICATIONS

English translation of JP-H02076517-U retrieved from JPO's Japan Platform for Patent Information website (partial translation) and from PE2E Search (full translation).*
(Continued)

*Primary Examiner* — Peter C English
(74) *Attorney, Agent, or Firm* — Carrier, Shende & Associates P.C.; Joseph P. Carrier; Fulchand P. Shende

(57) ABSTRACT

A rear part structure of a vehicle is disclosed which includes a groove formed in a longitudinal direction of the vehicle at a junction portion of a roof panel and a side frame of the vehicle and in which a hinge is attached for a tailgate to be installed at a rear part of the vehicle. The hinge includes a hinge base member attached into the groove, a gate hinge member attached to the tailgate which is pivotally attached to the hinge base member, and a cover which is fitted in the groove to conceal the hinge base member from view.

1 Claim, 19 Drawing Sheets

(51) Int. Cl.

| | |
|---|---|
| ***E05D 5/06*** | (2006.01) |
| ***E05D 7/04*** | (2006.01) |
| ***E05D 11/00*** | (2006.01) |
| *E05D 7/12* | (2006.01) |

(52) U.S. Cl.
CPC ..... *E05D 7/04* (2013.01); *E05D 11/0054* (2013.01); *E05D 7/121* (2013.01); *E05Y 2900/546* (2013.01)

(58) Field of Classification Search
CPC ..... E05D 11/0054; E05D 2011/0072; E05Y 2900/546; E05Y 2900/532
See application file for complete search history.

(56) References Cited

U.S. PATENT DOCUMENTS

| | | | | |
|---|---|---|---|---|
| 5,997,072 | A * | 12/1999 | Parkinson | 296/146.8 |
| 6,142,551 | A | 11/2000 | Ciavaglia et al. | |
| 6,145,917 | A * | 11/2000 | Ishii et al. | 296/146.8 |
| 6,299,243 | B1 * | 10/2001 | Gerald, Sr. | 296/210 |
| 6,336,674 | B1 * | 1/2002 | Gerisch et al. | 296/146.16 |
| 6,367,199 | B2 * | 4/2002 | Sedlak et al. | 296/56 |
| 6,401,392 | B1 * | 6/2002 | Yuge | 49/340 |
| 6,454,341 | B2 * | 9/2002 | Tolinski | 296/146.8 |
| 6,494,528 | B2 * | 12/2002 | Tolinski et al. | 296/216.04 |
| 6,505,878 | B1 * | 1/2003 | Mascolo | 296/146.16 |
| 6,588,151 | B1 * | 7/2003 | Goscicki et al. | 296/56 |
| 6,666,491 | B2 * | 12/2003 | Schrafel | 296/56 |
| 6,776,443 | B2 * | 8/2004 | Shimura et al. | 296/146.8 |
| 6,799,790 | B2 * | 10/2004 | Sakai et al. | 296/146.8 |
| 6,834,463 | B2 * | 12/2004 | Fukumoto et al. | 296/146.8 |
| 6,891,344 | B2 * | 5/2005 | Sakai et al. | 296/146.8 |
| 2004/0055112 | A1 * | 3/2004 | Kiefer et al. | 16/302 |

FOREIGN PATENT DOCUMENTS

| | | | | |
|---|---|---|---|---|
| EP | 0325707 | A2 | | 8/1989 |
| EP | 1136292 | A2 | | 9/2001 |
| JP | S49-049619 | U | | 5/1974 |
| JP | S61-115722 | U | | 7/1986 |
| JP | S61-189964 | U | | 11/1986 |
| JP | S63-006927 | U | | 1/1988 |
| JP | S63-097782 | A | | 4/1988 |
| JP | H01-057923 | U | | 4/1989 |
| JP | H02-076519 | U | | 6/1990 |
| JP | H02076517 | U | * | 6/1990 |
| JP | H03-019142 | U | | 2/1991 |
| JP | H05-001533 | U | | 1/1993 |
| JP | H05-280242 | A | | 10/1993 |
| JP | 2000071776 | A | * | 3/2000 |
| JP | 2000-158942 | | | 6/2000 |
| JP | 2000-158942 | A | | 6/2000 |
| JP | 2001-105867 | | | 4/2001 |
| JP | 2001-105867 | A | | 4/2001 |
| JP | 2001-199243 | A | | 7/2001 |
| JP | 2001-277856 | A | | 10/2001 |
| JP | 2003-072377 | A | | 3/2003 |
| JP | 2003-237370 | A | | 8/2003 |

OTHER PUBLICATIONS

English translation of JP-2000071776-A retrieved from EPO's Espacenet Patent Search website.*

* cited by examiner

FIG. 5
Amended
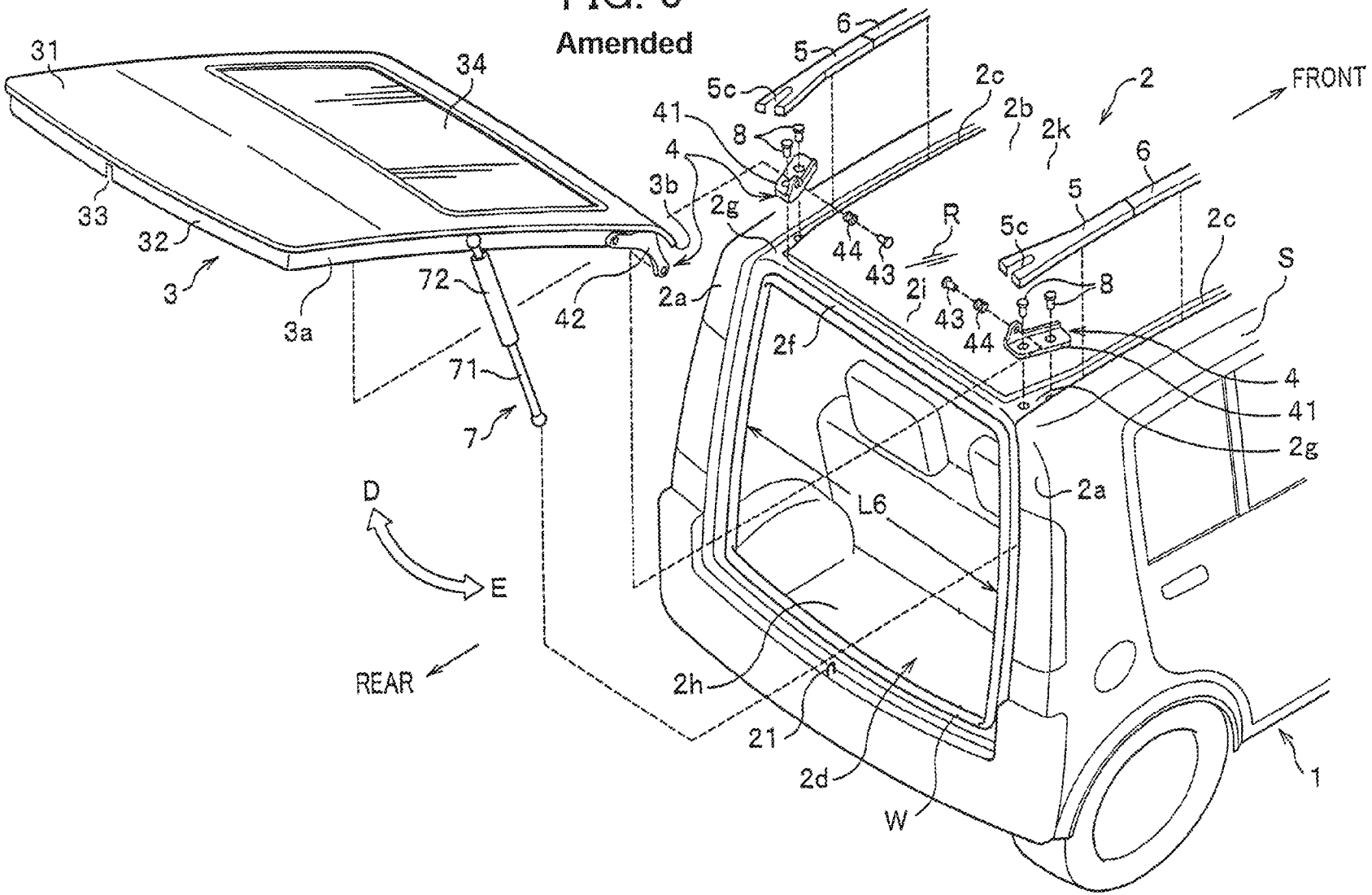

FIG. 12
Amended
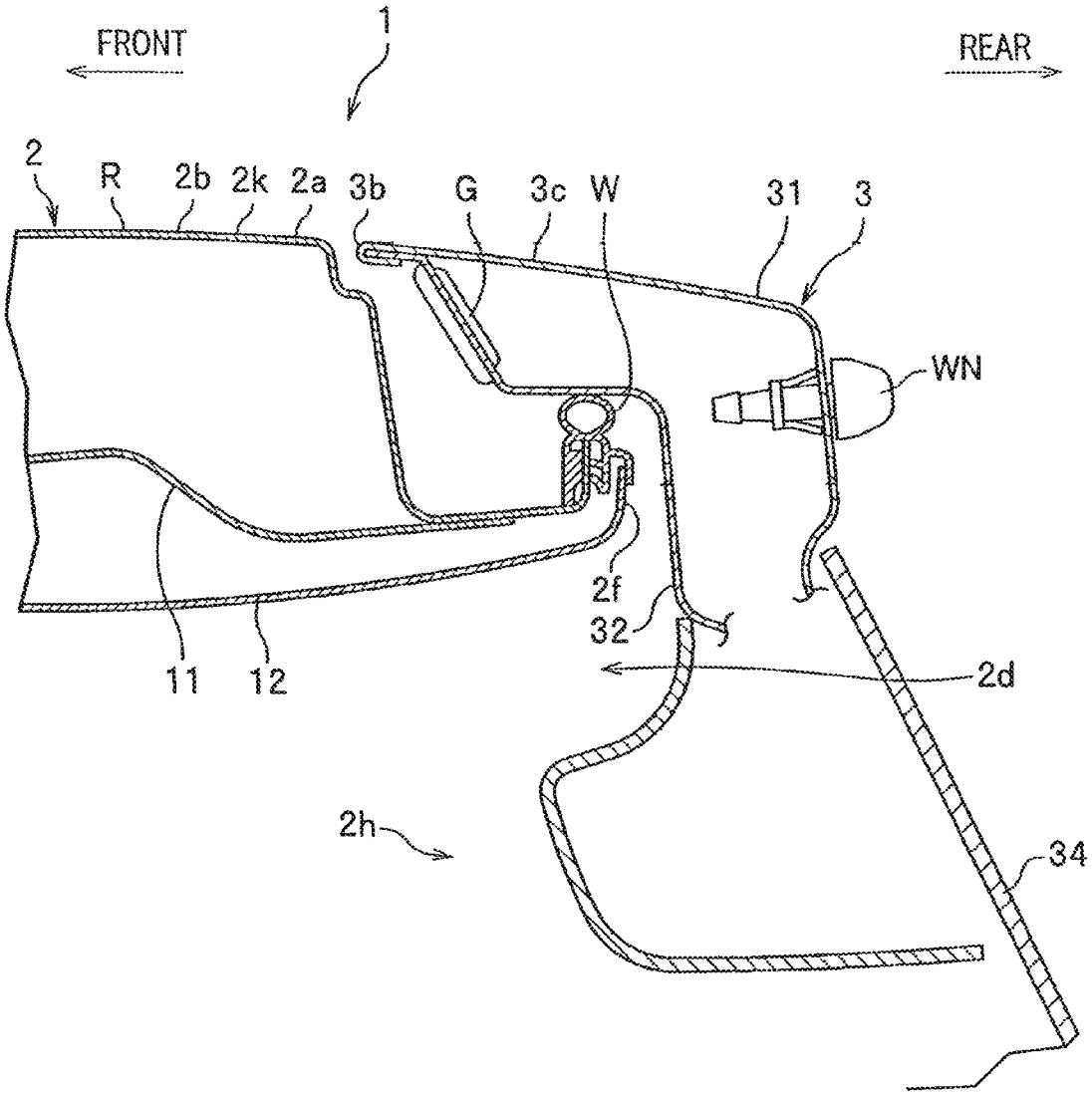

FIG. 20 Amended
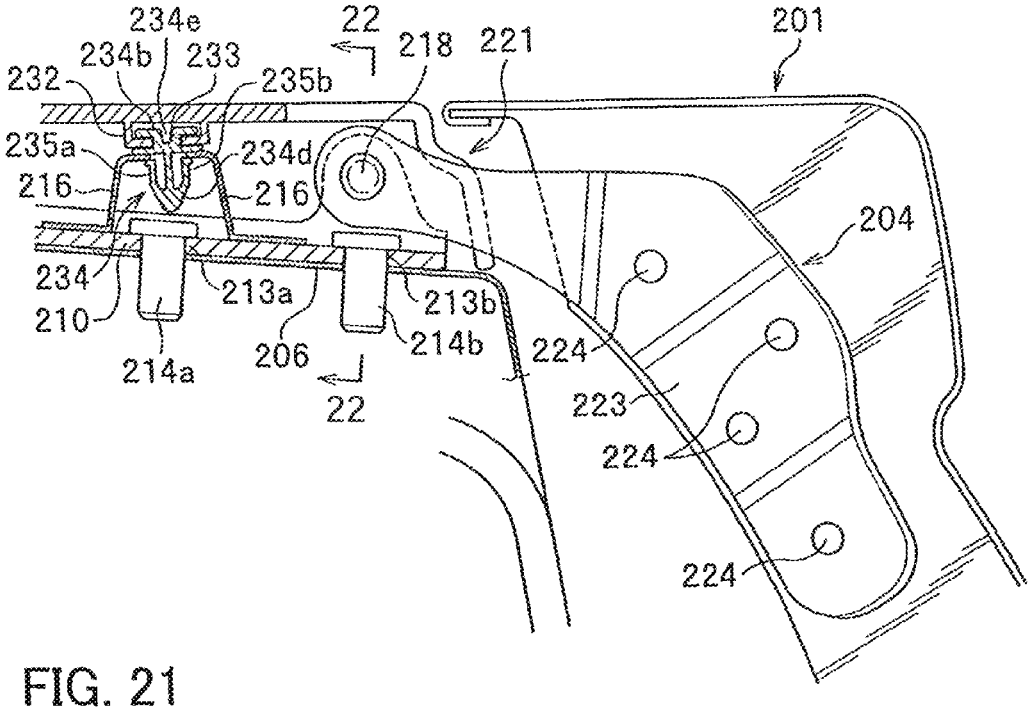
FIG. 21
Amended
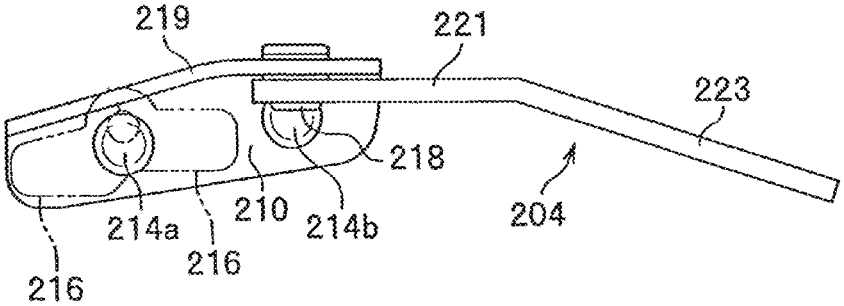
FIG. 22
Amended
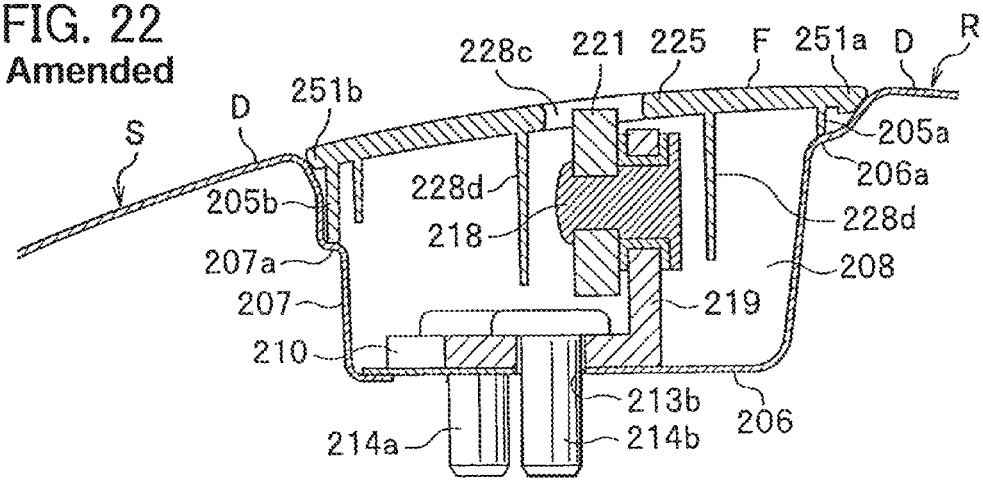

FIG. 23(a)
Amended
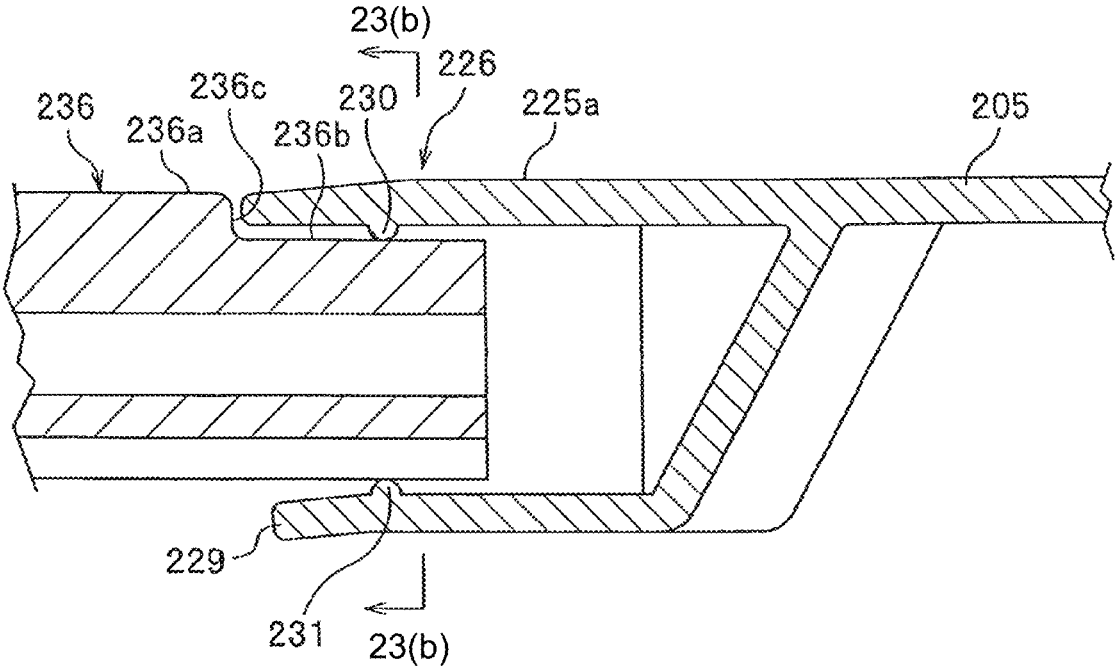

FIG. 24
Amended
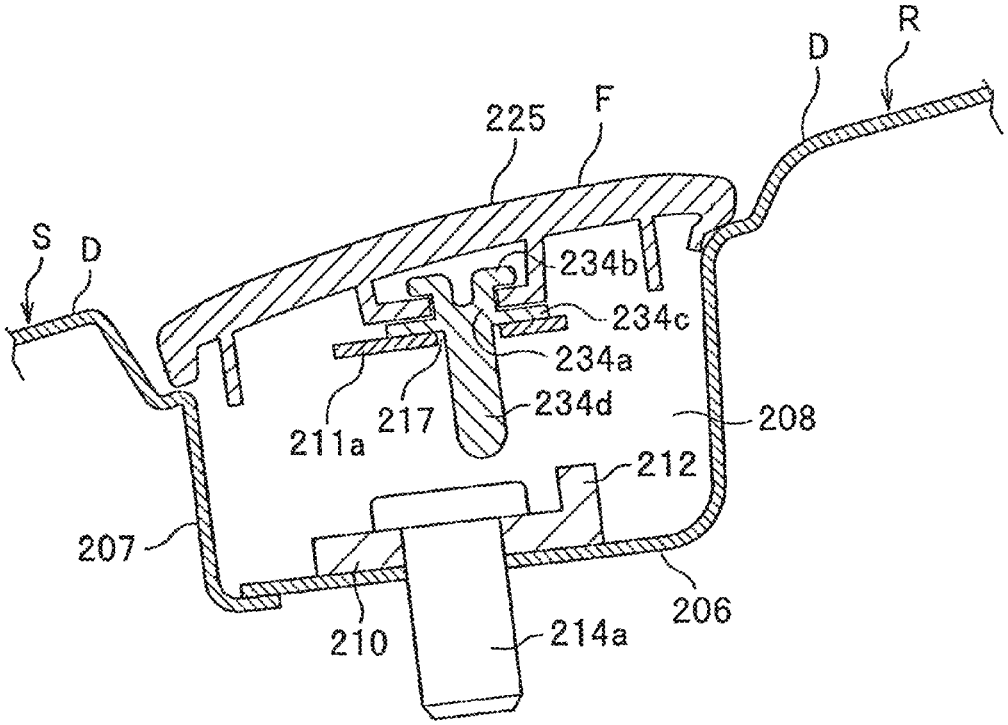

REAR PART STRUCTURE OF VEHICLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

INCORPORATION BY REFERENCE

The present application claims priority to Japanese Patent Application Nos. 2003-309919[, 2003-310102,] and 2003-309484, the contents of which are hereby incorporated by reference.

BACKGROUND OF THE INVENTION

1. Field of the invention

The present invention relates to a rear part structure for a vehicle, for installing a tailgate in a so-called mohican roof having a groove (mohican groove) extending in the forward and rearward direction of a vehicle at a connection portion between a roof panel of the vehicle body and a side frame thereof.

2. Discussion of Background Art

Conventionally, a hatchback tailgate composed of a hinge structure is provided in a recreation vehicle (RV) such as a minivan or a station wagon in order to easily place loads in the rear part of the vehicle. For example, refer to Japanese Unexamined Patent Publication No. 2001-105867 (paragraphs 0021 through 0022, and FIG. 12 and FIG. 13).

FIG. 1 is a view showing a prior art rear part structure of a vehicle, which is a sectional view showing the major parts in a state where the tailgate is closed.

As shown in FIG. 1, a tailgate 330 is installed so as to be vertically pivotable via a hinge 310 at the rear part 302 of a roof portion 301 of a vehicle body 300. A hinge pin 325 which becomes a rotating center of the hinge 310 axially supporting the tailgate 330 is disposed between the roof portion 301 and the tailgate 330. The hinge 310 is composed of a hinge base member 315 fixed on the roof portion 301 and a gate hinge member 320 fixed on the tailgate 330. The hinge 310 is installed at both left and right sides of the upper part of the gate opening portion 303 formed in the rear section 302 of the vehicle *body* 300, and pivotally supports the tailgate 330 so as to open it in the form of a pop-up system.

The hinge base member 315 is a metal plate member which is roughly L-shaped in its side view. A fixing portion 316 at the base end side is firmly attached to an upper part 304 of the gate opening portion 303 of the vehicle *body* 300 by means of a welding [bolt] *attachment member* 335, and a connection portion 317 at the tip end side is rotatably connected to the gate hinge member 320 by the hinge pin 325. The fixing portion 316 is fixed on a flat upper part 304 lower by a height L2 from the [ceiling] surface 305 of the roof portion 301.

The gate hinge member 320 is fixed, by a gate attaching bolt 340, on a roughly vertical attaching surface 332 where the fixing portion 321 at the base end side is formed on an upper part 331 of the tailgate 330, and a connection 322 at the tip end side is rotatably connected to the hinge base member 315 by the hinge pin 325.

When the tailgate 330 is opened, the tailgate 330 is turned in the direction of the arrow A centering around the hinge pin 325. At this time, parting *edge* 333 on the upper part of the tailgate 330 and the gate hinge member 320 are caused to turn integral with the tailgate 330, and the parting *edge* 333 turns in the direction of the arrow A and is caused to approach the fixing portion 316 of the hinge base member 315.

At this time, in order to prevent the parting *edge* 333 from being brought into contact with the roof portion 301, it is necessary for the hinge pin 325 to be disposed at a higher position by lengthening the arm length L1 at the hinge base member 315 which supports the gate hinge portion 320. By lengthening the arm length L1 of the hinge base member 315, it is necessary that, in the vehicle body 300, the length L2 from the installation plane of the upper part 304 on which the fixing portion 316 is provided to the [ceiling] surface 305 is lengthened, and the profile of the roof portion 301 is set in order to avoid the rotating locus of the parting *edge* 333 of the tailgate 330.

In line therewith, in the vehicle body 300, the thickness T1 from the upper end of the gate opening portion 303 in its upper direction to the [ceiling] surface 305 is increased, wherein the height H1 of the gate opening portion 303 in its upper direction is regulated, and the entire area of the gate opening portion 303 is narrowed. Therefore, in the gate opening portion 303, it becomes difficult to carry out loading a large load in or unloading the same from the luggage compartment because the height H1 is low.

Also, for a person in charge of loading or unloading, there is a fear that his or her head is brought into contact with the edge of the gate opening portion 303 during the loading or unloading since the inside upper end of the gate opening portion 303 is low.

In addition, where the tailgate 330 is attached to the vehicle body 300, it is possible to adjust the attaching position thereof in the top and bottom directions of the arrow B by making a through-hole 323, into which a gate attaching bolt 340 is inserted, into a slot longer in the top and bottom directions.

However, where the attaching position of the tailgate 330 is adjusted in the longitudinal (forward/backward) direction of the arrow C, since the fixing portion 316 of the hinge 310 is firmly fixed with rivets or welding [bolts] *attachment members* 335 so that the tailgate 330 does not raffle, it is necessary to modify the roof portion 301 of the vehicle body 300 or change the shape of the hinge 310. Therefore, with respect to the tailgate 330, it has been difficult to adjust the attaching position thereof in the longitudinal direction of the arrow C.

Further, [an open stay] *stays* (not illustrated) [is] *which hold the tailgate in an open position, or open stays, are* provided between the tailgate 330 and the vehicle body 300. [The one end] *First ends* of the open [stay is] *stays are respectively* supported at [both] *opposite* sides of the tailgate 330 and the other [end] *ends* thereof [is] *are respectively* supported at [both] *opposite* sides of the gate opening portion 303 in the vehicle width direction, respectively. And, the attaching [position] *positions* of the open [stay] *stays* (not illustrated) [intervening] *provided* between the tailgate 330 [secured at the end portion in the vehicle width direction of] *and* the gate opening portion 303 [and the vehicle body 300 is] *are* offset from the [hinge] *hinges* 310 in the vehicle width direction of the tailgate 330.

Therefore, there is a possibility for the tailgate 330 to be deformed so as to be distorted due to a reaction force of the open stay (not illustrated). Deformation of the tailgate 330 adversely influences the assembling dimensions, wherein there is a problem in that it takes many working hours for adjustment of the dimensions and composition.

It is a first object of the invention to provide a rear part structure of a vehicle by which larger dimensions can be secured with respect to the top and bottom directions of the gate opening portion of the tailgate, with respect to hinge means for a tailgate.

On the other hand, since the open stay (not illustrated) maintains an opened state of a tailgate when the tailgate being a heavy load is opened upwards, there are many cases where the open stay intervenes between the vehicle body and the tailgate for supporting the tailgate. As has been described in Japanese Unexamined Patent Publication No.2000-158942 (Paragraph 0009 and FIG. 7), a damper stay may be listed as a detailed example of the open stay, which carries a function for relieving a force when manually opening the tailgate upwards. Open stays such as a damper stay may be provided at both side ends of the tailgate as a pair. However, in recent years, taking economical efficiency of a vehicle into consideration or taking convenience into consideration with respect to the open stay be coming an obstacle in loading or unloading, there are many cases where the open stay is provided only at one side end of the tailgate.

In the case where open stays are provided at both side ends, reaction forces received from the respective open stays are added to the tailgate uniformly at both the left and right sides when an opening or closing operation is carried out or the tailgate is fully opened. However, in the case of a tailgate for which an open stay is provided only at one side end portion, the reaction force is centralized only at the side where the open stay is provided. Resultantly, where the attaching positions of the above-described pair of hinge members are made completely symmetrical with respect to the left and right sides, there is a problem in that, when the tailgate is assembled in a vehicle body, the side where no open stay is attached falls due to its own weight and is deflected, and a *difference in* level [gap] or deviation is apt to occur between the left and right sides of the tailgate.

In such cases, in the prior arts, adjustment work is required so as to absorb the above-described *difference in* level [gap] or deviation when assembling the tailgate and open stays in the vehicle body. A method for employing a so-called expectancy allowance, for example, adding an adjustment shim to one hinge member, was adopted as a detailed example. However, the adjustment work using such a shim results in a lowering in work efficiency, in particular, assembling work under a premise of such an expectancy allowance accompanies a difficulty in view of quantitativity and stability, and requires skill to some extent. In addition, in a case of complex component composition such as a tailgate and open stays, etc., it becomes difficult to accurately analyze the expectancy allowance.

Therefore, it is a second object of the invention to provide a rear part structure of a vehicle which does not require any adjustment work of shims, etc., and can easily early out assembling work of the tailgate.

Further, the tailgate is supported so as to be opened and closed by a tailgate hinge axially supported at the upper part of the opening portion. In Japanese Unexamined Patent Publication No. 2001-105867 described above, as shown in FIG. 2, a rear part structure that can vertically open and close a tailgate T by a tailgate hinge H axially supported at the rear end of a roof panel R so as to be rotatable is illustrated.

Conventionally, where a tailgate hinge is disposed outside a vehicle compartment, the tailgate hinge H is covered up by a spoiler SP or a resin-made garnish, as shown in FIG. 3, in view of the appearance of the vehicle or in order to avoid the exposure of the hinge to the outside of the vehicle. However, where the tailgate hinge H is covered up by the spoiler SP, etc., it is necessary to cover up the entirety of a tailgate hinge even for a tailgate hinge that seems to be sufficient to be partially outfitted in an attempt to secure harmony with respect to the entire appearance. For this reason, there is no way other than to employ a large-type resin component, wherein appearance matching with the surrounding components thereof becomes difficult, and there are some problems in that production costs are increased, and the number of steps is increased in the production process due to an increase in the number of components.

In addition, a tailgate hinge may be provided at the rear part of a vehicle or at the tailgate without using any outfitting components such as a spoiler, garnish, etc. For example, as shown in FIG. 4, the upper part of the roof panel R is formed to be bulge-shaped, and a tailgate hinge is accommodated in the bulge-shaped projection BG so that the tailgate is not exposed to the outside of a vehicle. However, in the case where the tailgate hinge is covered up at the rear part of a vehicle or at the tailgate side without using any outfitting components, the press-forming performance in production of roof panels may be worsened due to addition of some shapes onto the roof side, depending on the design shape. Therefore, it cannot be said to be convenient in view of design and production efficiency.

Further, a tailgate hinge may be disposed in a vehicle compartment. However, the appearance inside the vehicle compartment may be spoiled, although this depends on the positions of where it is disposed. Therefore, it is necessary to attach a hinge cover to cover up the tailgate hinge. For example, where a tailgate hinge is provided in the rear part of a vehicle compartment, it is necessary to attach a hinge cover in order to keep the appearance satisfactory inside the vehicle compartment. For this reason, the design inside the vehicle compartment is subjected to some limitations, resulting in inconvenience in production.

Therefore, it is a third object of the invention to provide a rear part structure of a vehicle, which attaches a tailgate hinge for axially supporting a tailgate to a roof panel without spoiling the vehicle appearance.

SUMMARY OF THE INVENTION

In order to achieve the first object, there is provided a rear part structure of a vehicle according to a first aspect of the present invention, which includes a groove formed in a longitudinal direction of the vehicle at a junction portion of a roof panel and a side frame of the vehicle and in which a tailgate to be installed at a rear part of the vehicle is attached by hinge; wherein the hinge comprises: a hinge base member attached into the groove; and a gate hinge member attached to the tailgate which is pivotally attached to the hinge base member.

According to such a rear part structure of a vehicle, by providing a hinge base member in the groove, the hinge means can be formed such that the rotating locus of the parting of the tailgate does not interfere with the roof panel of a vehicle. Therefore, it is possible to increase the dimension in the top and bottom directions of the gate opening portion that is opened and closed by the tailgate.

In addition, since the hinge is provided in a groove disposed in the left and right end portions of the roof portion of a vehicle, it is possible to increase the supporting interval of the tailgate. Therefore, the attaching strength of the tailgate can be increased.

In the aforementioned rear part structure of a vehicle, the gate hinge member may extend along a direction where the tailgate is opened and closed.

With such a construction, since the gate hinge member extends along the direction where the tailgate is opened and closed, a shearing force acts on the longitudinal plane direction of the gate hinge member at the time of opening and closing the tailgate. Therefore, the gate hinge member can be decreased in its outer shape and plate thickness. With this thin and small-sized gate hinge member, it is possible to reduce the weight and cost of the rear part structure. Further, since the gate hinge member attached to the tailgate is thin and compact, the hinge member does not protrude from the tailgate toward the interior of the vehicle. This leads to a good appearance as well as a sufficiently large space of the gate opening in the vehicle width direction. Therefore, loading and unloading of baggage can be facilitated.

In the aforementioned rear part structure, the gate hinge member may be attached to a side plane portion of the tailgate.

With such a construction, since the gate hinge member is attached to a side plane portion of the tailgate, the attaching work of the gate hinge member can be carried out on the side of the tailgate. Therefore, the worker can easily recognize and check the attaching position of the gate hinge member. Since the attaching work of the gate hinge member can be easily carried out while adjusting positions of the tightening bolts, efficiency of the attaching work can be improved.

Force acts on the fixing position of the gate hinge member and the tailgate not in a direction where the gate hinge member is removed from the tailgate at the time of opening and closing the tailgate but in the shearing direction. Therefore, bolts can provide a sufficiently great fixing strength. Since the hinge is required to withstand a large number repeated uses, the gate hinge member provides sufficient strength and durability for such repeated use.

In the aforementioned rear part structure, the gate hinge member may be adjustable in the longitudinal direction or the vertical direction of the vehicle with respect to the tailgate.

With such a construction, since the gate hinge member is adjustable in the longitudinal direction or the vertical direction of the vehicle with respect to the tailgate, it is possible to adjust an attachment position of the tailgate to eliminate unevenness of attachment errors. Therefore, the tailgate can be accurately attached at a predetermined position.

In the aforementioned rear part structure, *one end of* an open stay for fixing the tailgate may be [provided in the vicinity of] *attached to the side plane portion of the tailgate, and* an attaching portion of the gate hinge member *is also attached to the side plane portion of the tailgate.*

With such a construction, [since the open stay is installed in the vicinity of the attaching portion of the gate hinge member,] it is possible to reduce the offset amount between the attaching position of the open stay and hinge. Therefore, a moment applied by the open stay and the gate hinge member at the time of opening and closing the tailgate can be decreased, it is possible to prevent deformation of the tailgate as much as possible.

In the aforementioned rear part structure, the hinge base member may be covered by a hinge cover [continuously] extending from a roof moulding secured in the groove.

With such a construction, since the hinge base member may be covered by a hinge cover [continuously] extending from a roof moulding secured in the groove, the hinge cover can be positioned in conformity with the shape of the roof moulding with the gate hinge base unseen, thereby improving the appearance.

By the aforementioned rear part structure of a vehicle according to the first aspect of the invention, since a hinge base member is provided in the groove, the hinge base member can be formed such that the rotating locus of the tailgate does hot interfere with the roof panel of the vehicle body. Therefore, it is possible to increase the size of the gate opening in the vertical direction.

The hinge is provided with a gate hinge member extending along the direction where the tail gate is opened and closed, and the gate hinge member is attached to a side plane portion of the tailgate. It is therefore possible to reduce the thickness of the gate hinge member to increase the size of the gate opening in the vehicle width direction. Therefore, loading and unloading of baggage can be facilitated. Further, the gate hinge member is attached to a side plane portion of the tailgate. This can improve visibility of the worker at the attaching position of the gate hinge member, thereby improving workability for attaching the gate hinge member.

Further, since the hinge is secured in the groove positioned at the left and right end portions of the roof of the vehicle body, it becomes possible to increase the left and right supporting interval of the tailgate, increasing the attaching strength of the tailgate.

Since a shearing force acts on the longitudinal plane direction of the gate hinge member at the time of opening and closing the tailgate, the gate hinge member can be decreased in its outer shape and plate thickness. With this thin and small-sized gate hinge member, it is possible to reduce the weight and cost of the rear part structure.

Furthermore, since the hinge base member is covered by a hinge cover [continuously] extending from a roof moulding secured in the groove, the hinge cover can be positioned in conformity with the shape of the roof moulding with the gate hinge base unseen, thereby improving the appearance as well as decreasing wind noise upon driving the vehicle.

In order to achieve the second object, there is provided a rear part structure of a vehicle according to a second aspect of the present invention, comprising: a tailgate pivotally supported by a pair of hinge members with an upper edge of the tailgate positioned near a rotating axis of the hinged members such that the tailgate pivots in a vertical direction for opening and closing a rear part of the vehicle; and only one open stay provided at one side part of the tailgate and supporting the tailgate when the tailgate is opened upwards; wherein the respective hinge members have one end thereof [connected to] *provided at* the rotating axis at a vehicle body side and the other end thereof connected to a tailgate side via a gate attaching portion, and when the tailgate is closed, the gate attaching portion positions below the rotating axis; and when the tailgate is closed, the gate attaching portion of the hinge member at a side where the [pen] *open* stay is mounted is set to position below the gate attaching portion of the other hinge member.

According to such a rear part structure of a vehicle, a deviation between the right and left sides of the tailgate resulting from a reaction force from the open stay can be absorbed in advance by the hinge member per se. To be more specific, adjustment work by means of shims, etc. is not required for the correction of a deflection at the side where the open stay is not provided, because the amount of the deviation can be absorbed by the hinge member per se. Therefore, when assembling the tailgate in a vehicle body or when attaching the open stay, adjustment work is not required, leading to improved working efficiency.

In the aforementioned rear part structure, each of the hinge members may extend along a *respective* plane [including a direction] *parallel to directions in which* where the tailgate is opened and closed, and the gate attaching portion may be formed as a gate attaching hole passing through in a width direction of the vehicle.

With such a construction, when the tailgate is opened and closed, a load acts on the plane direction where [the] *each* hinge member extends. Therefore, it is possible to provide a sufficient strength against this opening/closing load. As the result, the hinge member can be decreased in its outer shape and plate thickness, leading to reduced weight and cost reduction.

In the aforementioned rear part structure, the hinge [member] *members* may be fixed at each side plane portion of the tailgate via the gate attaching [portion] *portions thereof.*

With such a construction, since assembling work of the hinge member can be carried out at a lateral position of the tailgate, which becomes an open space, the assembling work can be easily carried out. It is also possible to improve visibility of the attaching position of the hinge member with respect to the tailgate. Further, force acts on the fixing position of hinge member and the side plane portion not in a direction where the gate hinge member is removed from the tailgate at the time of opening and closing the tailgate but in the shearing direction. Therefore, *a* bolt or the like can provide a sufficiently great fixing strength.

In the aforementioned rear part structure, the hinge member may be adjustable in longitudinal and vertical directions of the vehicle with respect to the tailgate.

With such a constructions, since when attaching the tailgate to the hinge members, it is possible to readily adjust the attachment position of the tailgate to eliminate unevenness of attachment errors. Therefore, the accuracy for assembling the hinge member and the tailgate can readily be improved.

In the aforementioned rear part structure, the hinge [member] *members* may be secured in [a groove] *respective grooves* formed as a pair at right and left sides of a roof panel of the vehicle.

With such a construction, it is possible to prevent the attaching portion of the hinge member from protruding from the roof panel. In this instance, for example, as in one preferred embodiment of the present invention, the attachment position of the hinge member can be covered by the hinge cover, which also improves the appearance design.

By the rear part structure of a vehicle according to the second aspect of the present invention, a deviation between the right and left sides of the tailgate resulting from a reaction force from the open stay can be absorbed in advance by the hinge member per se. To be more specific, adjustment work by means of shims, etc. is not required for the correction of a deflection at the side where the open stay is not provided, because the amount of the deviation can be absorbed by the hinge member per se. Therefore, when assembling the tailgate in a vehicle body or when attaching the open stay, such adjustment work is not required, leading to improved working efficiency.

In order to achieve the third object, there is provided a rear part structure of a vehicle according to a third aspect of the present invention, comprising a tailgate; hinge members arranged at both upper right and upper left ends of a rear opening portion of the vehicle to pivotally open and close the tailgate; wherein each tailgate hinge member includes: a hinge base member fixed on a rear end bottom portion of a groove, which extends longitudinally of the vehicle at a junction portion between a side edge of a roof panel and an upper edge of a side frame, and which opens upwards to have a channel-shaped section; and a gate hinge portion mounted on the tailgate and pivotally supported by the hinge base member; and wherein a hinge cover for covering an upper part of the hinge base member is fitted into the groove.

According to such a rear part structure of a vehicle, in a vehicle including a so-called mohican roof, at which a groove extends in the longitudinal direction of the vehicle at a junction portion between a side edge of a roof panel and an upper edge of a side frame and opens upwards to have a channel-shaped section, the [tailgated] *tailgate,* to which is attached the gate hinge portion pivotally supported by the hinge base member, can be supported to open and close the rear opening portion of the vehicle. Also, the upper part of the hinge base member is covered by the hinge cover fitted in the groove. Therefore, it is possible to prevent the tailgate hinge member from being exposed to view without spoiling the appearance of the vehicle.

In the aforementioned rear part structure, the hinge cover may include an outer surface, which is connected to a rear end of a roof moulding fitted in the groove, and which is substantially flush with an outer surface of a rear part of the vehicle.

With such a construction, the outer surface of the hinge cover is connected to the rear end of the roof moulding fitted in the groove and is substantially flush with the outer surface of the rear part of the vehicle. Therefore, the outer surface of the hinge cover and the outer surface of the rear part of the vehicle form a unitary design appearance, improving the external appearance of the vehicle.

In the aforementioned rear part structure, the outer surface of the hinge cover may have a design appearance which is *substantially* continuous [from] *with an outer appearance of* an outer surface of a roof moulding fitted in the groove.

With such a construction, since the outer surface of the hinge cover has a design appearance which is *substantially* continuous with that of an outer surface of the roof moulding, the roof moulding fitted in the groove and the hinge cover form a unitary design appearance, improving the external appearance of the vehicle.

In the aforementioned rear part structure, the hinge cover may be connected to a rear end of the roof moulding so as to allow a relative displacement of the hinge cover with respect to a longitudinal direction of the roof molding.

With such a construction, since the hinge cover is connected to a rear end of the roof moulding so as to allow a relative displacement of the hinge cover with respect to the longitudinal direction of the roof molding, assembly of the hinge cover and other members, such as the roof moulding, and the hinge base member of the tailgate hinge member, can be improved.

In the aforementioned rear part structure, the hinge cover may have positioning ribs [along a longitudinal direction thereof and at both ends in a width direction of an underside thereof] *extending along side portions of the cover.* The positioning ribs are brought into contact with the side edge of the roof panel and the upper edge of the side frame, and allow an adjustment of a position of the hinge cover.

With such a construction, the positioning ribs provided along the longitudinal direction and at both ends in the width direction of the underside of the hinge cover abut on the side edge of the roof panel and the upper edge of the side frame, thereby reliably supporting the both ends of the hinge cover in its width direction to prevent swing of the hinge cover in its width direction.

In the aforementioned rear part structure, the hinge cover may include an engagement portion engaged with and secured at a single cover attaching portion of the hinge base member.

With such a construction, by the engagement between the cover attaching portion of the hinge base member and the engagement portion of the hinge cover, the hinge cover can be readily assembled to the hinge base member. Further, with the minimum number of fixing parts, it is possible to restrict cost and complexity of the structure.

Furthermore, there is provided a method for attaching a tailgate hinge member according to a third aspect of the present invention, which comprises the steps of: fixing a hinge base member of a tailgate hinge member on a rear end bottom portion of a groove, which extends longitudinally of a vehicle at a junction portion between a side edge of a roof panel and an upper edge of a side frame, and which opens upwards to have a channel-shaped section; thereafter connecting one end of a hinge cover for covering the corresponding hinge base member to a rear end of a roof moulding fitted in the groove; and engaging the other end of the hinge cover with a cover attaching portion of the hinge base member.

According to such a method, since one end of the hinge cover is connected to the rear end of the roof moulding, and the other end of the hinge cover is engaged with the cover attaching portion of the hinge base member, the assembly of the hinge cover can readily be made.

By the rear part structure of a vehicle according to the third aspect of the present invention, the upper part of the hinge base member is covered by the hinge cover fitted in the groove of the mohican roof. This can improve the external appearance of the vehicle while preventing the tailgate hinge member from being exposed to view. Further, the hinge cover for covering the hinge base member may be small-sized to be sufficient for being fitted into the groove. Therefore, large-sized plastic components or the roof panel with a special structure are not required, which leads to improved formability and reduced cost. Further, since there is no need to provide a large plastic part or a roof panel with a special structure, the design freedom of the vehicle can be improved.

BRIEF DESCRIPTION OF THE DRAWINGS

FIG. 5 is a view showing a rear part structure of a vehicle according to one embodiment of the invention, which is a disassembled perspective view showing the rear part of a vehicle;

FIG. 12 is a view showing a rear part structure of a vehicle according to the embodiment of the invention, which is an enlarged sectional view of the major parts showing a structure of the upper part of the central portion of the tailgate;

FIGS. 15(a)[,] *and* 15(b) are side sectional views showing the structure around the hinge member of the second embodiment, wherein FIG. 15(a) shows a state where the tailgate is fully closed.

FIG. 20 is a sectional view showing an assembling structure of the tailgate hinge member of the third embodiment;

FIG. 21 is a *top* plan view showing [an assembling structure of the tailgate hinge member and hinge cover of] *the tailgate hinge member according to* the third embodiment;

FIG. 22 is a sectional view taken along the arrow line [C-C] *22-22* in FIG. 20;

FIG. 23(a) is a sectional view illustrating a connection between the hinge cover and the roof moulding of the third embodiment, FIG. 24[(a)] is a sectional view illustrating engagement between the hinge cover and the hinge base member of the tailgate hinge member of the third embodiment.

DETAILED DESCRIPTION OF THE INVENTION

First Embodiment

Figure 1:
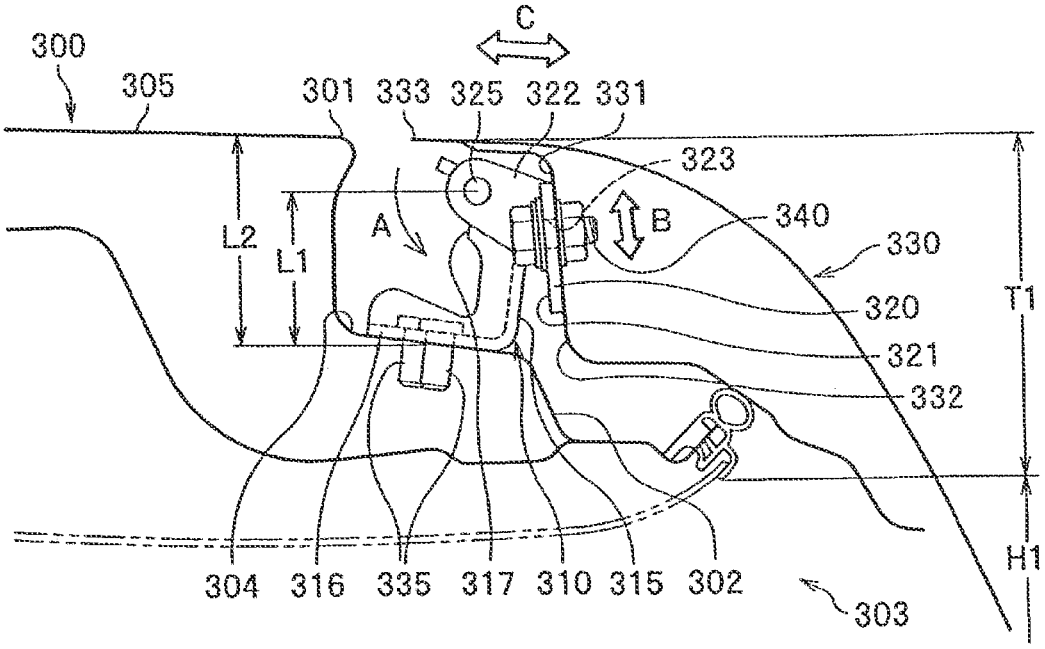
FIG. 1 PRIOR ART
FIG. 1 is a view showing a prior art rear part structure of a vehicle, which is a sectional view showing the major parts in a state where the tailgate is closed.
Figure 2:
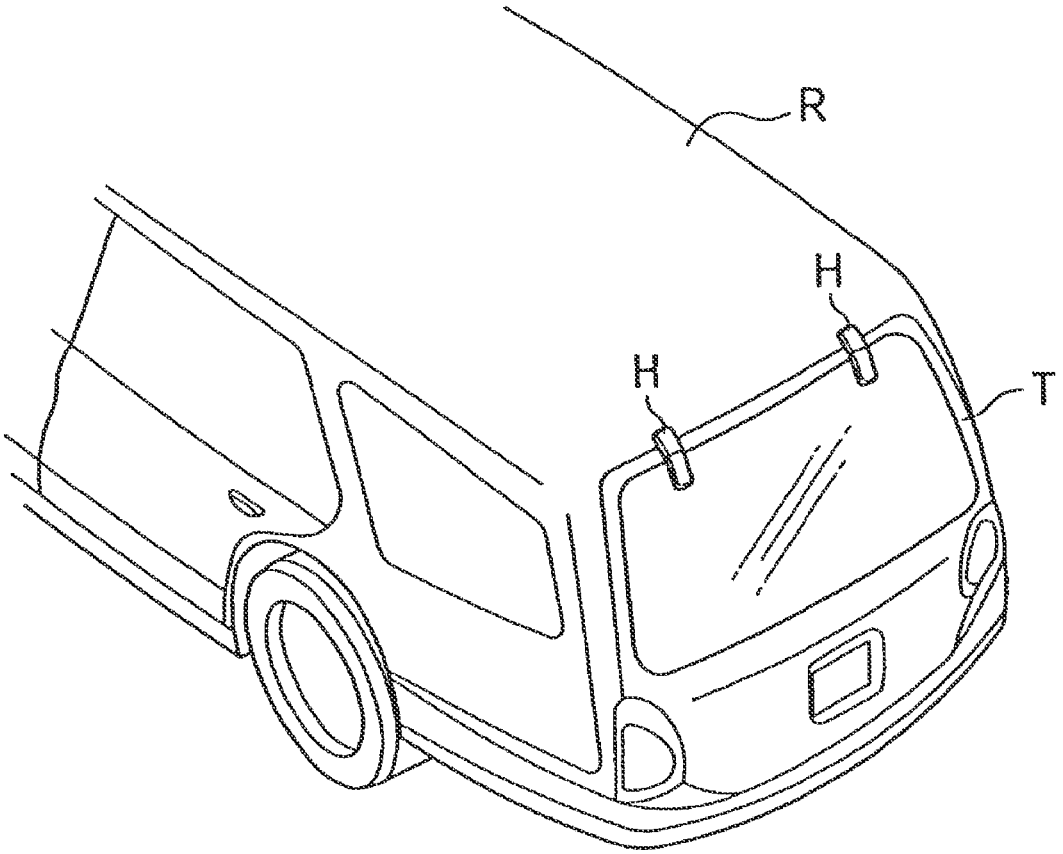
FIG. 2 PRIOR ART
FIG. 2 is a general perspective view showing a hinge in a prior art tailgate of a vehicle.
Figure 3:
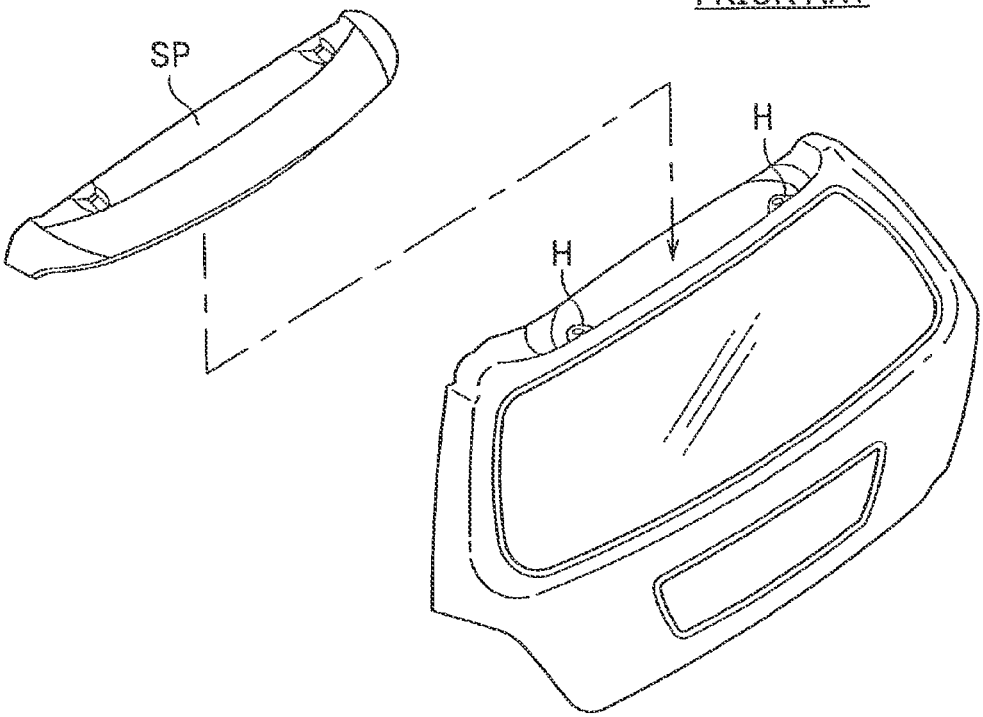
FIG. 3 PRIOR ART
FIG. 3 is a perspective view showing a structure example in which the *prior art* tailgate hinge is hidden by a spoiler.
Figure 4:
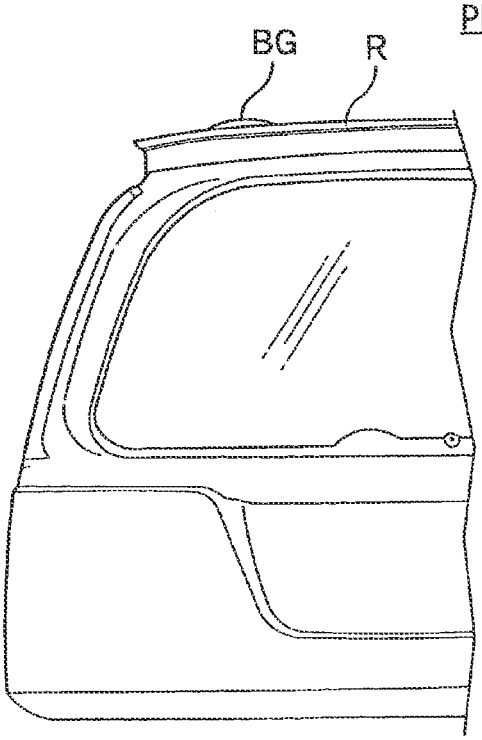
FIG. 4 PRIOR ART
FIG. 4 is a view showing a structure example in which the *prior art* tailgate hinge is accommodated in a bulge-shaped projection formed on the roof panel.
Figure 6:
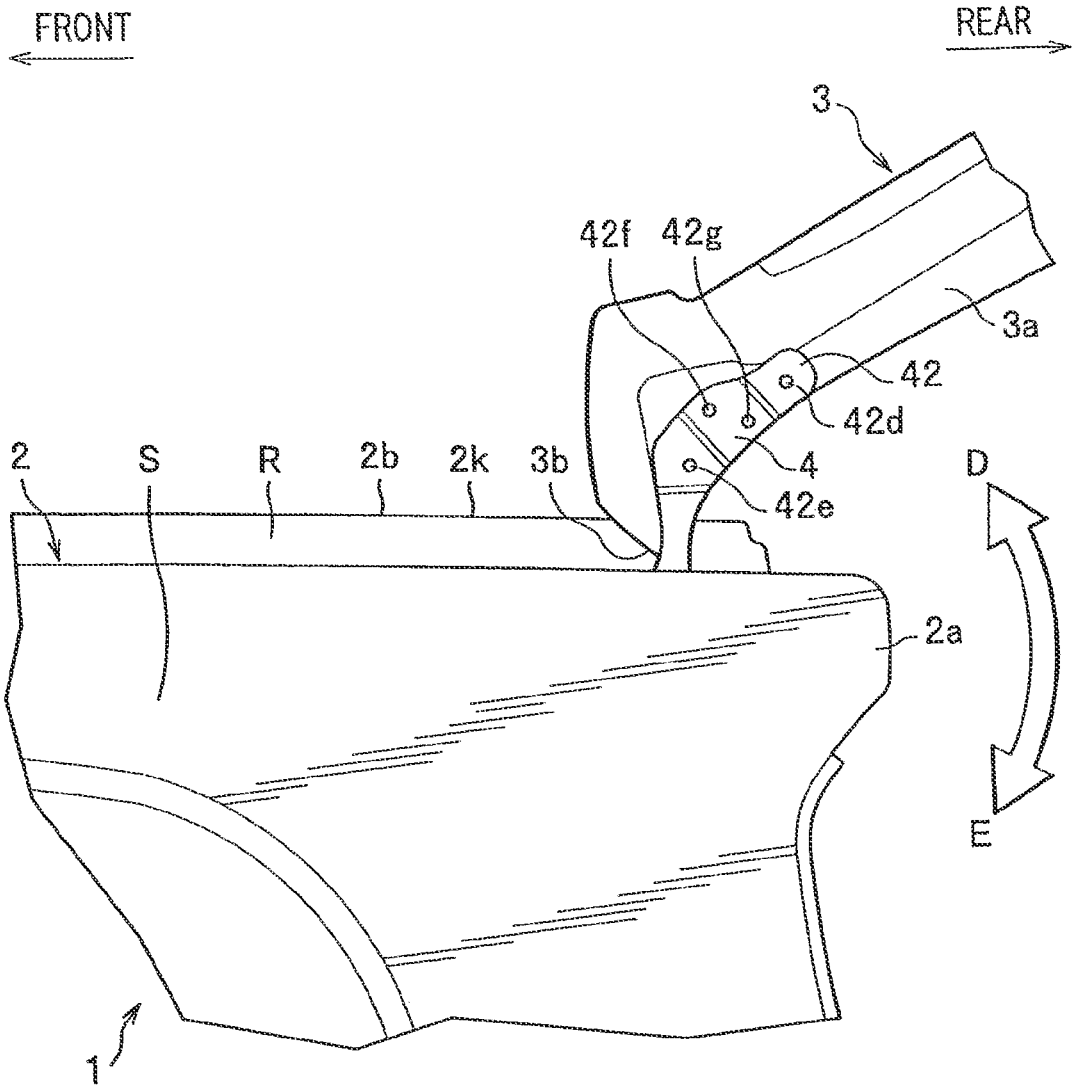
FIG. 6 is a view showing a rear part structure of a vehicle according to the embodiment of the invention, which is an enlarged side elevational view of the major parts showing a state where the tailgate is mounted.

Hereinafter, a description is given of a rear part structure of a vehicle according to a first embodiment of the present invention with reference to FIG. 5 through FIG. 12.

Also, in the embodiment, "front" means the side in the forward direction of a vehicle, "rear" means the side in the rearward direction of a vehicle, "up or upper" means the upper side in the perpendicular direction, "down" means the lower side in the perpendicular direction, and "left and right" means the width direction of a vehicle.

As shown in FIG. 5, a vehicle 1 is, for example, a minivan, station wagon, or hatchback. A pop-up type tailgate 3 composed of a hinge structure is provided at the rear part 2a of the vehicle body 2.

A gate opening portion 2d opened and closed by the tailgate 3 is formed at the rear face side at the rear part 2a of the vehicle body 2, and the gate opening portion 2d is provided with a hinge 4 and a hinge cover 5 at both left and right ends of the upper part thereof.

A luggage compartment 2h is formed in a vehicle interior at the rear part 2a of the vehicle body 2, wherein loads can be loaded and unloaded by opening the tailgate 3.

The roof portion 2b is a [ceiling] portion of the vehicle body 2, and is composed of a roof panel R disposed at the middle portion and side frames S disposed at both left and right end sides in the vehicle width direction of the roof panel R. The left and right end sides of the roof panel R and the upper end side of the side frames are joined to each other by welding means. [The] *Each of the* connected [portion] *portions* has a groove (mohican groove) 2c formed, which consists of a junction groove, extending [from both] *into either* the left [and] *end portion or* right end [portions] *portion* in the vehicle width direction of the roof portion 2b of the vehicle body 2 in the longitudinal direction, the section of which is roughly channel-shaped opening upwards.

The [groove] *grooves* 2c [is] *are each* formed along the longitudinal direction of the vehicle 1 from the edge of the front glass (not illustrated) at the front end of the roof portion 2b to the edge of the gate opening portion 2d at the rear end thereof. The width of *each of* the [groove] *grooves* 2c in the vehicle width direction is widened at the rear part 2a of the vehicle body 2, and [a hinge] *hinges 4,* 4 which rotatably [supports] *support* the tailgate 3 on the vehicle body 2 [is] *are* installed in the widened rear end bottom [portion] *portions 2g,* 2g. [The] *Each* hinge 4 is hidden by *a corresponding one of* the hinge [cover] *covers 5,* 5. [The] *Each* hinge cover 5 is fitted at the rear part 2a side where the hinge 4 is installed, and a *corresponding one of* roof [moulding] *mouldings 6,* 6 is continuously fitted forward of the hinge cover 5.

[Further, the rear end bottom part 2g of the groove 2c corresponds to an "attaching portion" described in the claims.]

As shown in FIG. 12, [a damper member which dampens an impact generated when closing the tailgate 3, a waterproof member which prevents rainwater from invading, and] a weatherstrip W operating as a sealing material, which prevents air and sound from invading [are] *is* installed at the flange 2f in the inner circumferential edge of the gate opening portion 2d. [A] *As shown in FIG. 5, a* striker 21 with which a lock portion 33 secured at the tailgate 3 is engaged is installed at the lower middle part of the gate opening portion 2d.

Also, the weatherstrip W is formed of a synthetic rubber or foamed resin material.

In addition, a rear roof rail (upper) 11 and a rear roof rail (lower) 12, which extend in the vehicle width direction, overlap each other and are installed inside the roof panel R at the rear part 2a of the vehicle body 2 (Refer to FIG. 12).

The tailgate 3 is a backdoor for opening and closing the gate opening portion 2d and is formed [by a hemming process] using an outer panel 31 and an inner panel 32, which are rolled steel plates.

As shown in FIG. 5, a gate hinge member 42 rotatably attached to the hinge base member 41 by means of a hinge pin 43 and an [open] stay 7 *which holds the tailgate in an open position, or open stay,* installed at the right edge of the gate opening portion 2d so as to turn are *respectively* attached at the [side plane portion 3a at the left and right upper end parts] *part and the right side plane portion 3a* in the vehicle width direction of the tailgate 3. *Another gate hinge member 42 (not shown in FIG. 5) is attached at the left upper end part in the vehicle width direction of the tailgate 3.* Window glass 34 is secured in the tailgate 3 so that the rear view of the vehicle 1 can be visually confirmed during driving.

As shown in FIG. 12, a grommet G is provided at the upper part 3c of the tailgate 3, through which a cable to be connected to lamps (not illustrated) such as a stop lamp secured in the tailgate 3 and a pipe to be connected to a wiper washer nozzle WN are passed.

Also, the upper part 3c of the tailgate 3 is formed to be comparatively long in the longitudinal direction and to be thick so that a rear spoiler (not illustrated) can be installed.

Figure 8:
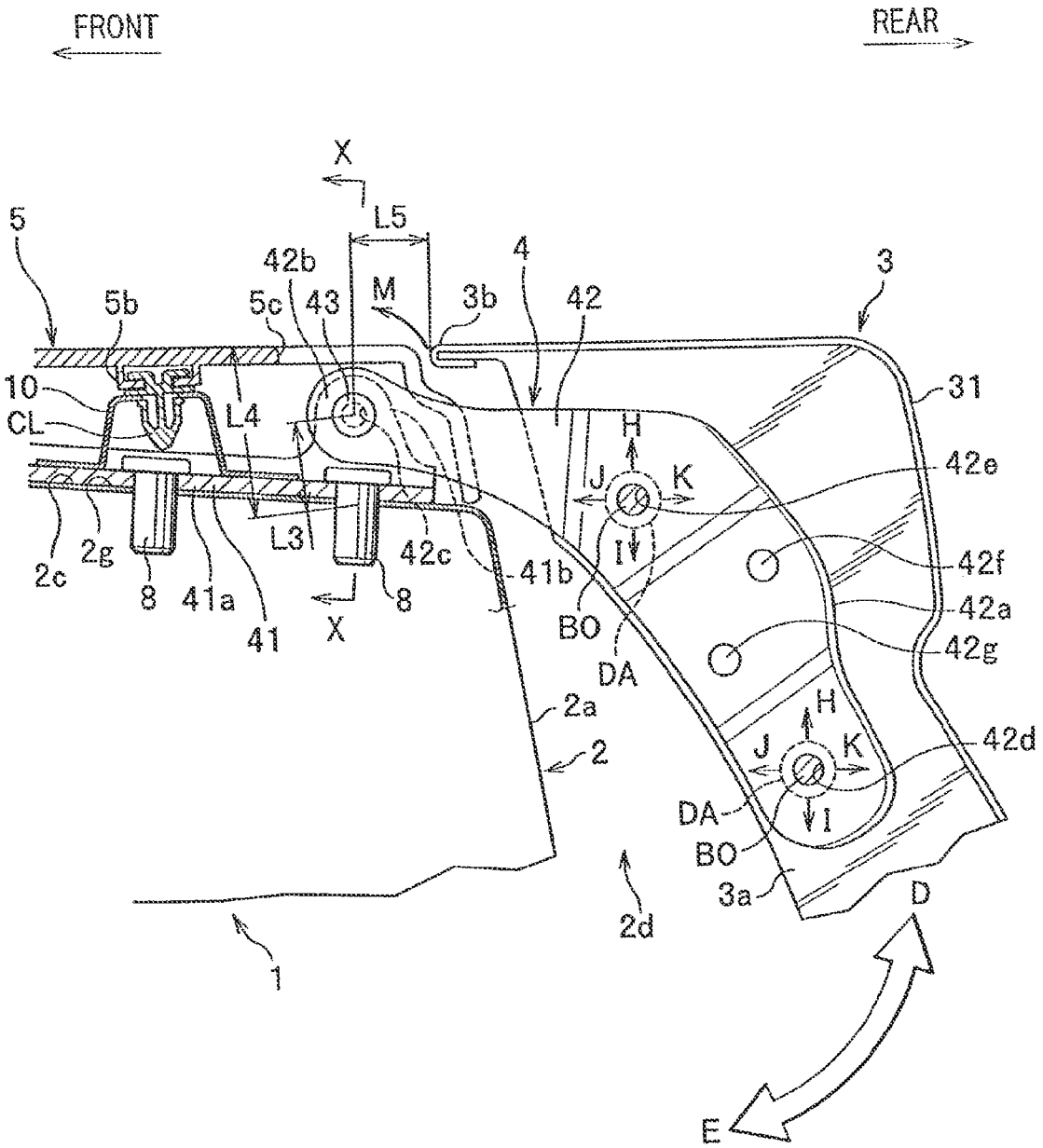
FIG. 8 is a view showing a rear part structure of a vehicle according to the embodiment of the invention, which is an enlarged sectional view of the major parts showing a state where the tailgate is mounted.
Figure 9:
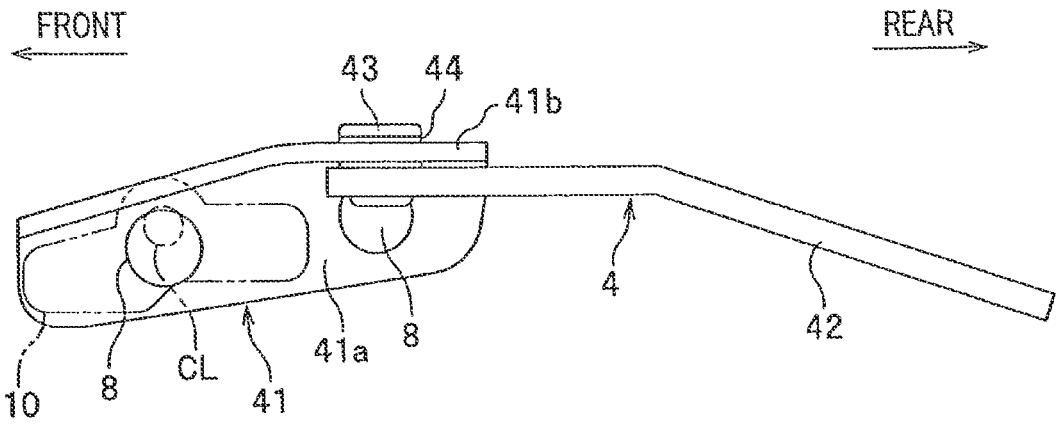
FIG. 9 is a view showing a rear part structure of a vehicle according to the embodiment of the invention, which is an enlarged plan view of the hinge.

As shown in FIG. 8, [a hinge] *hinges 4,* 4 [is] *are* installed to open and close the tailgate 3 in the form of pop-up type centering around the upper end portion of the gate opening portion 2d of the vehicle body 2. [The] *Each* hinge 4 is made of, for example, a steel plate pressed material. [The] *Each* hinge 4 is composed of a hinge base member 41 fixed at *a corresponding one of* the [groove] *grooves* 2c of the vehicle body 2, a gate hinge member 42 attached to the tailgate 3, and a hinge pin 43 for connecting the hinge base member 41 and the gate hinge member 42 so as to be freely turned (pivoted).

Also, the hinge 4 corresponds to the hinge in the claims.

Figure 7:
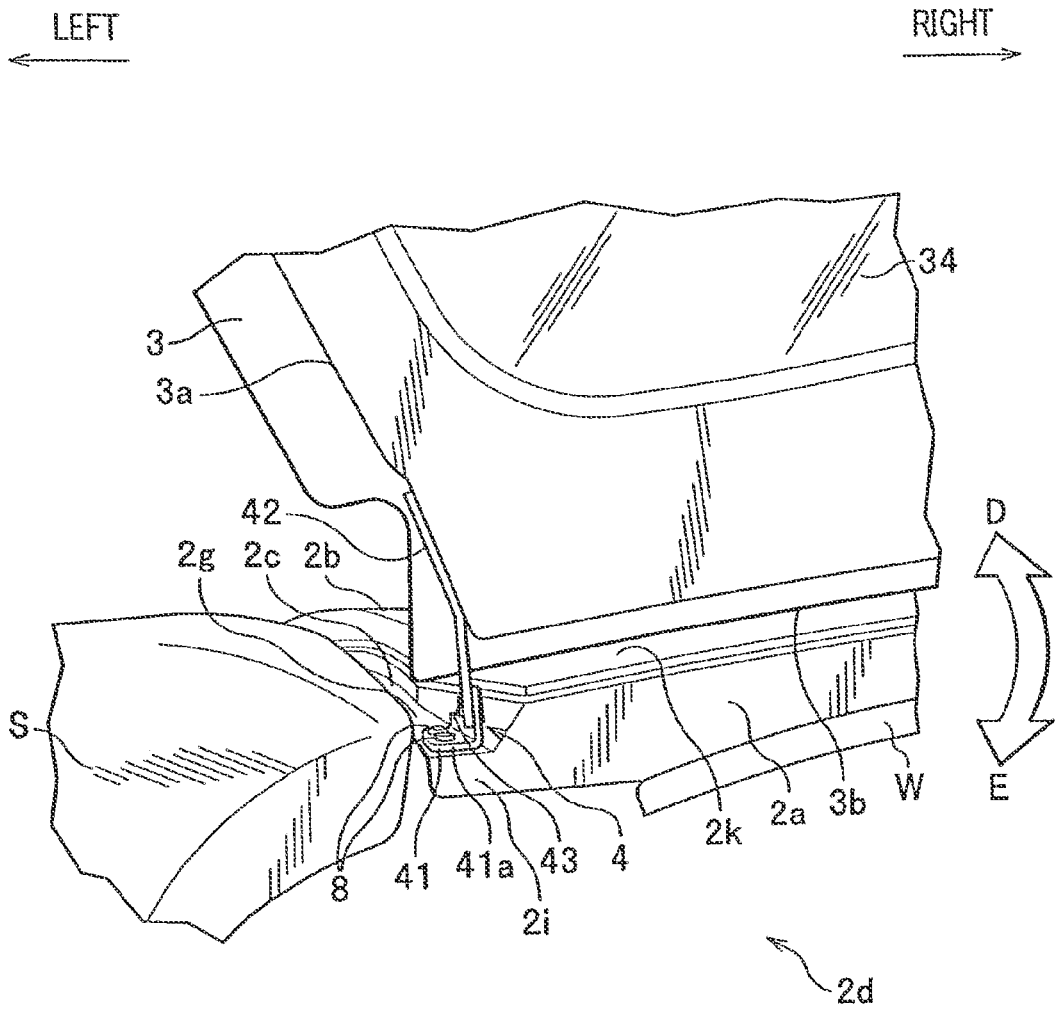
FIG. 7 is a view showing a rear part structure of a vehicle according to the embodiment of the invention, which is an enlarged perspective view of the major parts showing a state where the tailgate is mounted with the hinge cover removed.
Figure 10:
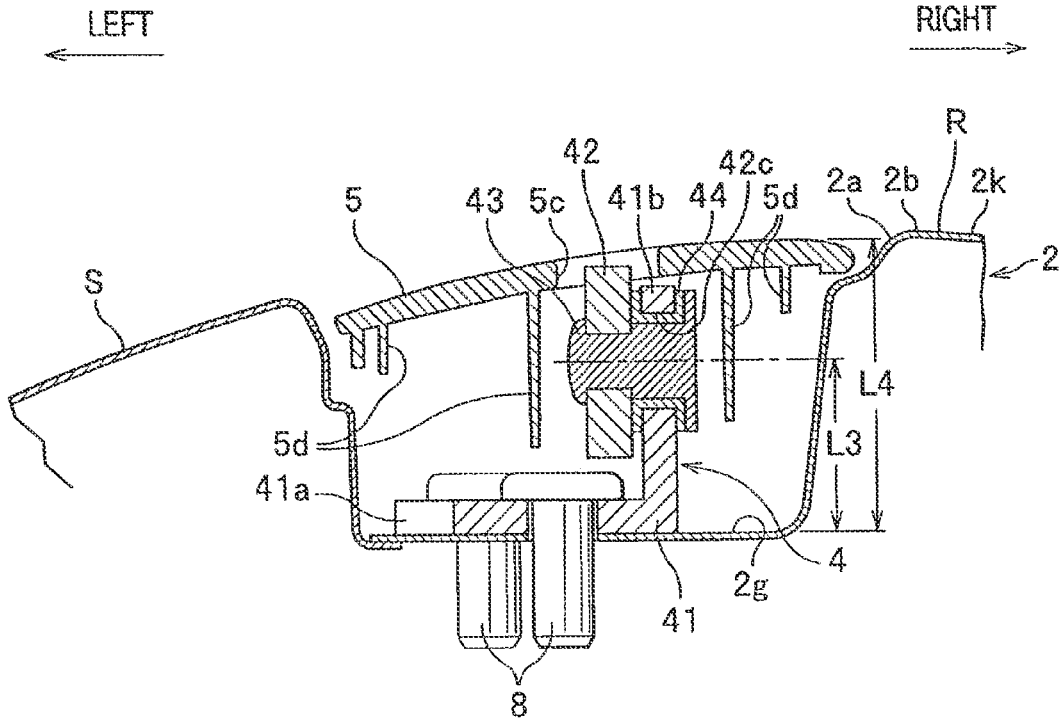
FIG. 10 is a sectional view taken along the arrow line X-X in FIG. 8.

As shown in FIG. 7 and FIG. 10, the hinge base member 41 *on the left side of the vehicle body* is composed of a thick metal plate material which is roughly L-shaped when being observed from the rear side. At the hinge base member 41, the fixing part 41a at the vehicle body 2 side (that is, the base end side) is firmly attached to the *left side of the* upper part 2i of the gate opening portion 2d of the vehicle body 2 by means of fixing members 8 for a vehicle, and the connection portion 41b (refer to FIG. 10) at the tip end side is connected to the gate hinge member 42 by the hinge pin 43 so as to be turned. The fixing part 41a is fixed at the rear end bottom portion 2g of the *corresponding* groove 2c lowered by a height L4 from the [ceiling] surface 2k of the roof portion 2b. The hinge base member 41 is covered up with the *corresponding* hinge cover 5 continued from the roof moulding 6 (refer to FIG. 5) secured in the groove 2c.

The fixing members 8 for a vehicle are members for firmly fixing the hinge base member 41 in the vehicle body 2, for example, and may be composed of welding [bolts] *attachment members*. Also, the fixing members 8 for a vehicle may be rivets, etc.

As shown in FIG. 8, *each of* the gate hinge [member] *members 42,* 42 is composed of a thick metal flat plate which is roughly L-shaped in its side view. The gate hinge [member] *members 42,* 42 [extends] *extend* along *respective planes parallel to* the opening and closing directions (the directions of the arrows D and E) of the tailgate 3 and the side plane portion 3a of the tailgate 3. As shown in FIG. 8, *each of* the gate hinge [member] *members 42,* 42 is provided with a through-hole 42c having the hinge pin 43 inserted through the front end part thereof, through-holes 42d and 42e for attaching [a] fixing [bolt] *bolts BO,* BO, which are drilled at the rear end part and the middle part thereof, and through-holes 42f and 42g, drilled between the through-hole 42d and the through-hole 42e, in which a provisional setting bolt (not illustrated) may be inserted for provisionally fixing a fixture (not illustrated). [The] *Each of the* gate hinge [member] *members 42,* 42 is composed so that the connection portion 42b at the front end part side is installed so as to be turned at the *corresponding* hinge base member 41 by the hinge pin 43, and at the same time, the fixing part 42a at the rear end part side attaches the side plane portion 3a of the tailgate 3 while adjusting the position thereof in the vertical and longitudinal directions (the arrows H, I, J and K) as shown ins FIG. 8.

The tailgate 3 is provided so that the connection portion 42b is adjusted in the longitudinal directions (the arrow directions [H and I] *J and K*) of the vehicle 1 and in the height directions (the arrow directions [J and K] *H and I*) thereof with respect to the vehicle body 2 by means of the gate hinge member 42 continued from the hinge pin 43.

The hinge pin 43 is composed of, for example, a rivet-shaped metal axial member for pivotally connecting the hinge base member 41 and the gate hinge member 42. The hinge pin 43 is made maintenance-free by fitting a bushing 44 composed of oil-contained resin or oil-contained sintered metal in order not to require oil supply to the hinge 4 as shown in FIG. 10.

Figure 11:
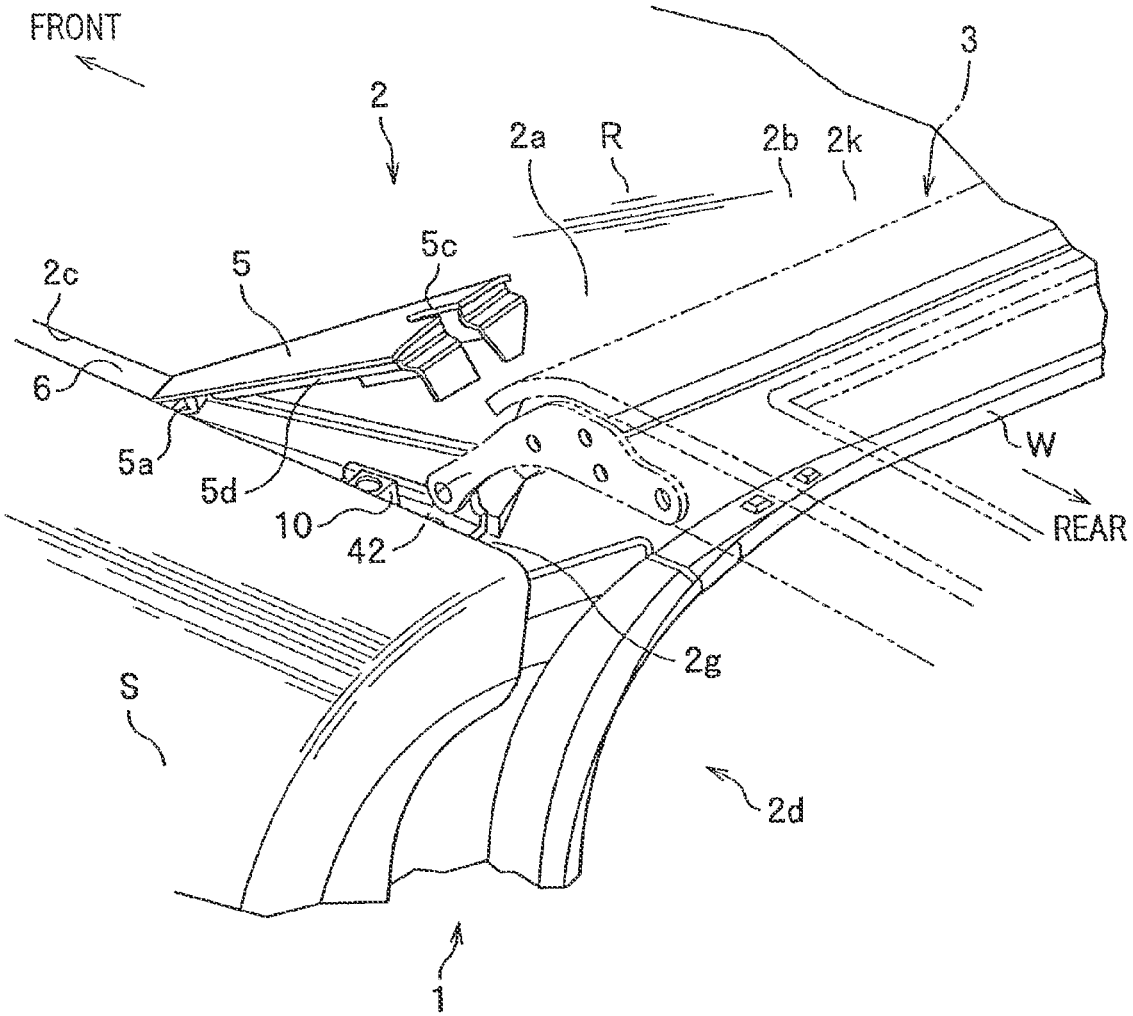
FIG. 11 is a view showing a rear part structure of a vehicle according to the embodiment of the invention, which is an enlarged perspective view of the major parts showing a state where the cover of the hinge base member is installed.

As shown in FIG. 5, *each of* the hinge [cover] *covers 5,* 5 covers up the upper part of the *corresponding* hinge base member 41 and is formed of plate-shaped synthetic resin formed to the shape of the rear end portion of the groove 2c. As shown in FIG. 11 *with respect to the left hinge cover 5,* [the] *each* hinge cover 5 has an engagement portion 5a formed at the front end portion, a bracket portion 5b (Refer to FIG. 8) for clip CL installation, which is formed on the underside, reinforcement ribs 5d formed at a plurality of points on the underside, and the notched portion 5c formed at the middle part of the rear end portion, all of which are formed to be integral with each other. The *left side* hinge cover 5 is fixed, as shown in FIG. 11, at the vehicle body 2 side by placing its engagement portion 5a in the rear end portion of the *corresponding* roof moulding 6 and fitting the clip CL in the cover fixing member 10 fixed on the upper plane of the hinge base member 41 as shown in FIG. 8. The *left side* hinge cover 5 forms a notch 5c at the middle of the rear end portion, [by] *in* which the *corresponding* gate hinge member 42 can be [turned] *moved* when the tailgate 3 is turned in the direction of the arrow D and is opened.

Further, the cover fixing member 10 is a trapezoidal bracket which is formed of, for example, flat plates, and has a through-hole in which the clip CL is engaged.

As shown in FIG. 5, the open stay 7 is composed of a gas spring to be fixed in the vehicle body 2 so that the tailgate 3 can be opened and closed while balancing with the weight of the pop-up tailgate 3 when it is opened and closed. The open stay 7 includes a piston rod 71 pivotally attached to the right end part of the gate opening portion 2d of the vehicle body 2 and a tube cylinder 72 pivotally attached to the tailgate 3 while advancing and retreating resiliently with respect to the piston rod 71. The open stay 7 [is provided in the vicinity of the attaching portion (the rear end bottom portion 2g) of the hinge base member 41 fixed at the vehicle body 2] *includes one end attached at a vertically intermediate portion of the side plane portion 3a of the tailgate 3 while the gate hinge member is provided at an upper portion of the side plane portion as shown.*

Next, a description is given of an assembling procedure of the rear part structure of a vehicle according to the first embodiment of the invention.

As shown in FIG. 5, where the tailgate 3 is attached to the rear part 2a of the vehicle body 2, first, the [hinge] *hinges 4,* 4, in *each of* which the hinge base member 41 and gate hinge member 42 are connected by means of the hinge pin 43 [is], *are* attached to the rear end bottom [portion] *portions 2g,* 2g of the [groove] *grooves 2c,* 2c by the fixing members 8 for a vehicle.

Next, the roof [moulding] *mouldings 6,* 6 [is] *are* fixed in the [groove] *grooves 2c,* 2c by using an adhesive agent. The engagement portion 5a of [the] *each* hinge cover 5 is fitted to the rear end of the *corresponding* roof moulding 6 (Refer to FIG. 11), the clip CL attached to the underside of [the] *each* hinge cover 5 is pressure-fitted into the *corresponding* cover fixing member 10, and [the] *each* hinge cover 5 is fixed so as to cover up the *corresponding* hinge base member 41 fixed at the vehicle body 2 (Refer to FIG. 8). The [groove] *grooves 2c,* 2c which [is] *are* conventionally available to connect the roof panel R and the side [frame] *frames S,* S to each other can be effectively used as an attaching point of the [hinge] *hinges 4,* 4 and hinge [cover] *covers 5,* 5. Therefore, the profile of the upper portion of the rear part 2a of the vehicle body 2 can be established without any limitation.

The hinge [cover] *covers 5,* 5 can be attached with only one-touch operation by engaging the engagement portion 5a formed at the front end with the rear end of the *corresponding* roof moulding 6 as shown in FIG. 11 and pushing the clip CL attached to the underside into the cover fixing member 10 fixed at the *corresponding* hinge base member 41 as shown in FIG. 8.

[The] *Each* hinge base member 41 is covered up by the *corresponding* hinge cover 5 and is prevented from being exposed as shown in FIG. 5, and at the same time is disposed in the longitudinal direction to the *corresponding* roof moulding 6. And by making the upper surface of the roof [moulding] *mouldings 6,* 6 flush with the upper surface of the hinge [cover] *covers 5,* 5, it is possible to secure a design shape matched to the appearance of the surrounding parts such as the roof [moulding] *mouldings 6,* 6, wherein the appearance can be improved.

Next, as shown in FIG. 5, the piston rod 71 of the open stay 7 is rotatably disposed at the right upper edge of the gate opening portion 2d. And, the tube cylinder 72 of the open stay 7 is rotatably attached to the side plane portion 3a of the tailgate 3 with a fixture (not illustrated) attached to the tailgate 3.

Next, as shown in FIG. 8, [a] provisional fixing [bolt] *bolts* (not illustrated) [is] *are* inserted into the through-holes 42f and 42g of *each of* the gate hinge [member] *members 42,* 42 with the tailgate 3 opened in the direction of the arrow D and is screwed in the tailgate 3, thereby causing the tailgate 3 to be provisionally fixed at the [hinge] *hinges 4,* 4. If a fixture (not illustrated) is moved in the vertical and longitudinal directions (the arrows H, I, J and K) in a state where the [hinge] *hinges 4,* 4 [is] *are* provisionally fixed at the tailgate 3, the tailgate 3 is moved in the same direction.

And, the fixing bolts BO of the tailgate 3 are inserted into through-holes 42e and 42d, respectively, and the attaching positions thereof are adjusted in the vertical and longitudinal directions of the arrows H, I, J and K in the respective adjustable ranges DA. Then, the tailgate 3 is matched to a prescribed position of the [hinge] *hinges 4,* 4, and the fixing bolts BO are firmly tightened for regular tightening of the tailgate 3.

And, the respective provisional fixing bolts (not illustrated) are removed from the through-holes 42f and 42g and the fixture is removed. As a result, the tailgate 3 is fixed in a state determined with respect to the gate opening portion 2d and the [hinge] *hinges 4,* 4. As described above, since, only by adjusting the positions in the through-holes 42e and 42d, the tailgate 3 can be adjusted in terms of position with respect to the gate opening portion 2d of the vehicle body 2 and the [hinge] *hinges 4,* 4 thereof, the number of steps of adjusting the positions is reduced, and the work can be simplified.

The work for attaching the tailgate 3 on the [hinge] *hinges 4,* 4 by the fixing [bolt] *bolts* BO is carried out from the direction of the side plane [portion] *portions 3a,* 3a of the tailgate 3 with the tailgate 3 opened, wherein since the attaching point of the gate hinge [member] *members 42,* 42 by using the fixing [bolt] *bolts* BO can be visually confirmed, the work can be easily earned out.

Also, since work for attaching the [hinge] *hinges 4,* 4 to the tailgate 3 or detaching the same therefrom is carried out from the direction of the side plane [portion] *portions 3a,* 3a where any member hindering the work is not provided, the work can be smoothly carried out.

Since the gate hinge [member] *members 42,* 42 [is] *are* installed at the left and right side plane portions 3a and 3a of the tailgate 3, the supporting span between the hinge 4 on the left side plane portion 3a and the hinge 4 on the right side plane portion 3a is widened, wherein the retaining ability and rigidity of the tailgate 3 can be improved by means of the hinges 4 and 4.

Further regarding the hinges 4 and 4, since the flat gate hinge members 42 and 42 are attached to the side plane portions 3a and 3a of the tailgate 3, the occupancy of the hinges 4 and 4 in the vehicle width direction is slight, wherein there is no case where the length L6 of the gate opening portion 2d in the width direction (Refer to FIG. 5) is limited. The length L6 of the gate opening portion 2d in the width direction (Refer to FIG. 5) is lengthened so as to widen the area, and thereby the loading and unloading work of loads can be facilitated.

Also, as shown in FIG. 5, since, in the gate hinge [member] *members 42,* 42, the hinge base [member] *members 41,* 41 [is] *are* installed in the [groove] *grooves 2c,* 2c on the roof portion 2b, and the gate hinge [member] *members 42,* 42 [is] *are* installed at the side plane [portion] *portions 3a,* 3a of the tailgate 3, the hinge base [member] *members 41,* 41 and the gate hinge [member] *members 42,* 42 are not exposed to the luggage compartment 2h. Therefore, the appearance inside the luggage compartment 2h can be improved, and at the same time, clearance of the gate opening portion 2d and space in the luggage compartment 2h can be widened. Accordingly, loading of loads into the luggage compartment 2h and unloading thereof through the gate opening portion 2d can be easily carried out.

Next, a description is given of actions of the rear part structure of a vehicle according to the first embodiment of the present invention.

If the tailgate 3 is opened, as shown in FIG. 5, the tailgate 3 and gate hinge [member] *members 42,* 42 are integrally turned and opened in the direction of the arrow D centering around the hinge [pin] *pins 43,* 43 disposed between the roof portion 2b and the tailgate gate 3. At this time, the tailgate 3 is slowly opened by means of the open stay 7.

And, as shown in FIG. 8, the parting *edge* 3b at the upper end of the tailgate 3 is turned in the direction of the arrow M centering around the hinge [pin] *pins 43,* 43. At this time, the parting *edge* 3b is disposed at a position apart by a distance L5 rearward from the hinge [pin] *pins* 43, wherein the rotating locus is made to be above the [ceiling] surface 2k (Refer to FIG. 10), wherein the parting *edge* 3b can turn without any interference with the vehicle body 2. Therefore, it becomes possible to make short the length L3 of an arm of [the] *each* hinge base member 41 protruding upwards from the lower portion 2g of the rear end of the *corresponding* groove 2c of the vehicle body 2. Accordingly, it is possible to make short the height L4 from [the] *each* rear end lower portion 2g to the [ceiling] surface 2k (Refer to FIG. 10), wherein [an] installation [groove] *grooves* for installing the [hinge] *hinges 4,* 4 at the rear part 2a of the vehicle body 2 may become sufficient with a shallow groove such as the [groove] *grooves 2c,* 2c. And, as regards the rear part 2a of the vehicle body 2, a degree of freedom in design and setting of the dimensions of the gate opening portion 2d can be brought about, and the setting is enabled with a sufficient allowance.

As shown in FIG. 5, even if a moment and [distorsional] *distortional* deformation are added to the [hinge] *hinges 4,* 4 and the open stay 7 when opening and closing the tailgate 3 since the *right side* hinge 4 is installed comparatively in the vicinity of the open stay 7, the moment applied to the tailgate 3 is less, wherein the tailgate 3 is free from any distortion.

As shown in FIG. 7, the tailgate 3 is turned in the direction of the arrow E and the gate opening portion 2d is closed. At this time, [the] *each* gate hinge member 42 is turned in the [extending directions] *direction* (that is, the shearing direction) [of] *along which* the gate hinge member 42 [on its surface and rear sides] *extends*, and its turning direction is roughly coincident with the turning direction of the tailgate 3[, wherein a]. *A* force applied to opening and closing of the tailgate 3 is given to [the] *gate hinge member 42 along* plane directions [on its surface and rear sides of the gate hinge member 42] *in which they extend*. Therefore, the [hinge] *hinges 4,* 4 [has] *have* strength with respect to the opening and closing directions of the tailgate 3, wherein the rigidity is improved to a large extent, and the gate hinge [member] *members 42,* 42 can be downsized.

Second Embodiment

Hereinafter, with reference to FIG. 13 through FIG. 15, a description is given of a rear part structure of a vehicle according to a second embodiment of the present invention.

Hereinafter, a description is based on a mode where the present invention is applied to a minivan type vehicle.

Figure 13:
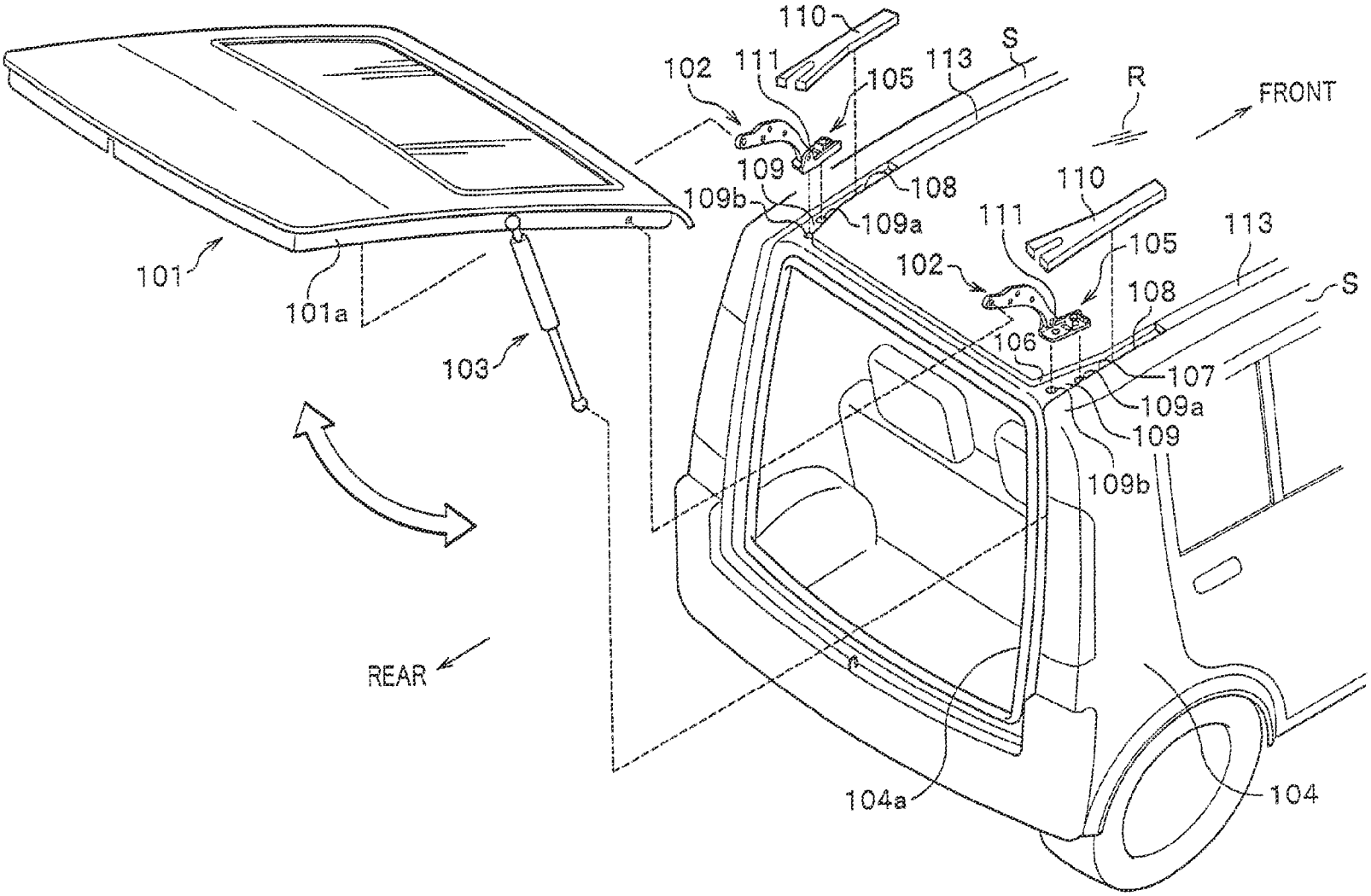
FIG. 13 is a perspective view showing a state where respective components of the rear part structure according to a second embodiment of the invention are disassembled.

As shown in FIG. 13, a rear part structure of a vehicle according to the present invention mainly comprises a tailgate 101 attached to the opening portion 104a formed on the rear face of a vehicle body 104, a pair of left and right gate hinge members [(hereinafter merely called a "hinge member")] 102, *102* which are attached upward in the rear part of a vehicle and support the tailgate 101 so as to turn to open and close in the vertical direction, and an open stay 103 for [connecting] *holding* the tailgate 101 *in an open position relative* to the vehicle body 104, which is attached only to one side of the tailgate 101.

The open stay 103 is installed at one side portion of the tailgate 101 (in the present embodiment, at the right side portion). For example, a gas damper which has been publicly known is applied as the open stay 103. The gas damper has a force of turning and pushing the tailgate 101 in its opening direction in order to help a user when he or she manually opens the tailgate 101 and has an adequate resisting force when the tailgate 101 is closed.

Respective hinge members 102, *102* are attached to the vehicle body 104 via hinge attaching seats 105, *105*. The respective hinge attaching seats 105, *105* are installed and fixed at the bottom [portion] *portions 109,* 109 of a pair of left and right grooves 108, *108* formed *at a junction* of [a side end] *lateral* side *ends 106,* 106 of the roof panel R of a vehicle and [an] upper end [side] *sides 107,* 107 of the roof side frame S in the rear upper part of the vehicle. Roof reinforcing members extending in the vehicle width direction, center pillars (both of which are not illustrated), etc., are disposed inside the roof panel R, and these members are coupled to the roof panel R, roof side frame S, etc., and compose the basic frame of the vehicle *body* 104.

Figure 14:
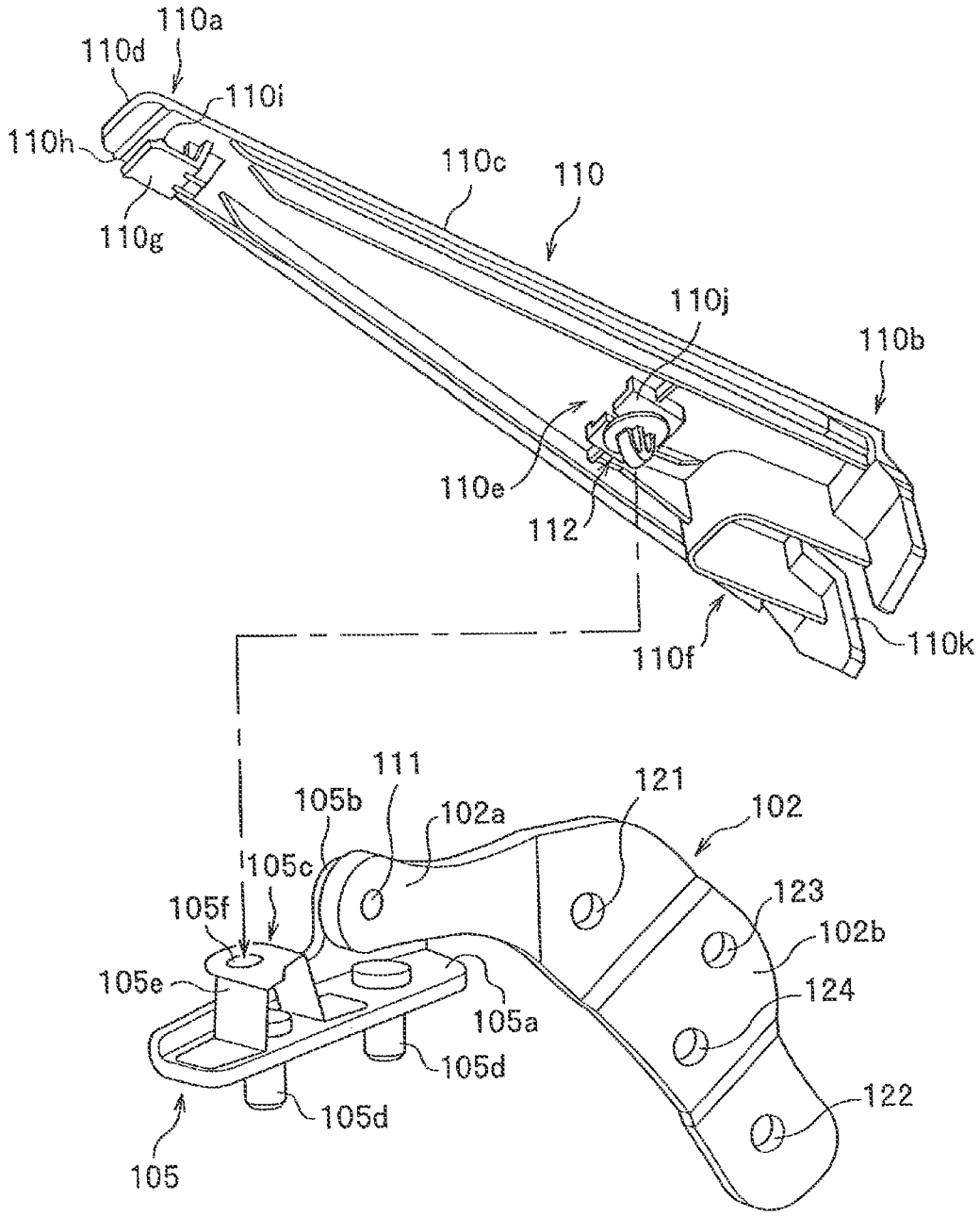
FIG. 14 is an enlarged perspective view showing the hinge member and hinge cover of the second embodiment.

As shown in FIG. 14, the hinge attaching seat 105 is composed of a flat base plate portion 105a fixed and installed in contact with the bottom portion 109 (Refer to FIG. 13), a hinge axial-supporting plate portion 105b erected on the side portion of the base plate portion 105a, and a cover attaching portion 105c for attaching the hinge cover 110 later described in detail. Attaching pins 105d fitted into attaching holes 109a and 109b (FIG. 13), which are drilled in the bottom portion 109 (FIG. 13) are provided so as to protrude from the bottom surface of the base plate portion 105a. For example, a rivet or the like is available as the attaching pin 105d. The cover attaching portion 105c is composed of a leg portion 105e formed upwards of the head portion of one attaching pin 105d and an engagement hole 105f drilled in the upper surface of the leg portion 105e. A rotating axis 111 whose axial direction is made into the vehicle width direction is formed on the hinge axial supporting plate portion 105b, and the hinge member 102 is attached so that it rotates centering around the rotating axis 111.

[A hinge cover] *Hinge covers 110,* 110 [is a member] *are members* for covering up the hinge attaching [seat] *seats 105,* 105 by being attached to the [groove] *grooves 108,* 108 (FIG. 13). And, [the] *each* hinge cover 110 is composed of a roughly triangular plate-shaped cover base body 110c having a narrow end portion 110a and a wide end portion 110b at both end portions in the lengthwise direction (that is, the longitudinal direction of a vehicle), a moulding [braid] connection portion 110d secured at the narrow end portion 110a, an engagement portion 110e engaged in the engagement hole 105f, and a cover portion 110f secured at the wide end portion 110b. The moulding [braid] connection portion 110d is composed of a narrow end portion 110a of the cover base body 110c, and an engagement tongue portion 110g branched from the underside of the narrow end portion 110a and extending in the forward direction of a vehicle. On the underside of the narrow end portion 110a, a linear projection 110h for upper engagement is provided toward the engagement tongue portion 110g along the vehicle width direction. On the upper surface of the engagement tongue portion 110g, another linear projection 110i for lower engagement is provided so as to correspond to the upper engagement linear projection 110h. The engagement portion 110e is composed of a hollow box-shaped base 110j formed on the underside of the cover base body 110c and an engagement pin 112, which is attached to the underside of the base 110j and is resiliently deformable. In addition, a relief groove 110k for inserting the *corresponding* turning hinge member 102 is formed on the wide end portion 110b of [the] *each* cover base body 110c.

In FIG. 13, the roof [moulding] *mouldings 113,* 113 [is] *are* fitted to the [portion] *portions* forward of the [groove] *grooves 108,* 108, and when attaching the hinge [cover] *covers 110,* 110 composed of the above components before or after fitting the roof [moulding] *mouldings 113,* 113, the rear end of the roof [moulding] *mouldings 113,* 113 (FIG. 13) [is] *are* placed between the narrow end [portion] *portions 110a,* 110a of the moulding [braid] connection [portion] *portions 110d,* 110d and the engagement tongue [portion] *portions 110g,* 110g in FIG. 14, and at the same time, the engagement [pin] *pins 112,* 112 [is] *are* engaged in the engagement [hole] *holes 105f,* 105f, whereby when the hinge [cover] *covers 110,* 110 [is] *are* attached to the rear [part] *parts* of the [groove] *grooves 108,* 108 in FIG. 13, the upper [surface] *surfaces* of the roof [moulding] *mouldings 113,* 113 [is] *are* made flush with the upper [surface] *surfaces* of the hinge [cover] *covers 110,* 110 to secure a smooth configuration.

Now, as shown in FIG. 14, *each of* the hinge [member] *members* 102 is composed of a turning arm portion 102a axially supported on the rotating axis 111 in the forward side of the vehicle and a gate supporting portion 102b formed to be integral with the turning arm portion 102a and becomes an attaching supporting portion of the tailgate 101. [The] *Each* hinge member 102 is formed of, for example, a steel plate pressed article, and in the present embodiment, it is formed to be a roughly flat plate-shaped member. The plate surface thereof extends [almost on the] *along a respective* plane [including] *parallel to* the opening and closing directions of the tailgate 101, that is, a [perpendicular] plane [along] *parallel to* the longitudinal direction of the vehicle.

In the tailgate 101, as shown in FIG. 13, the side plane [portion] *portions 101a,* 101a [is] *are* formed in the vicinity of the left and right edge portions at the plane side facing the inside of the vehicle compartment so that [it is erected] *they extend* toward the inside of the compartment and along the vertical direction of the tailgate 101. (In FIG. 13, only the right side plane portion 101a is shown). The tailgate 101 is attached in the form that [the] *each* side plane portion 101a is brought into facial contact with the gate supporting portion 102b of the *corresponding* hinge member 102. Concretely speaking, as shown in FIG. 15, [the] *each* hinge member 102 is slightly bent and formed so that it becomes roughly elbow-shaped in its side view, and the recess portion side thereof is disposed so as to face the inside of the compartment, wherein [the] *each* gate supporting portion 102b is connected to the upper part of the *corresponding* side plane portion 101a of the tailgate 101.

Figure 15A:
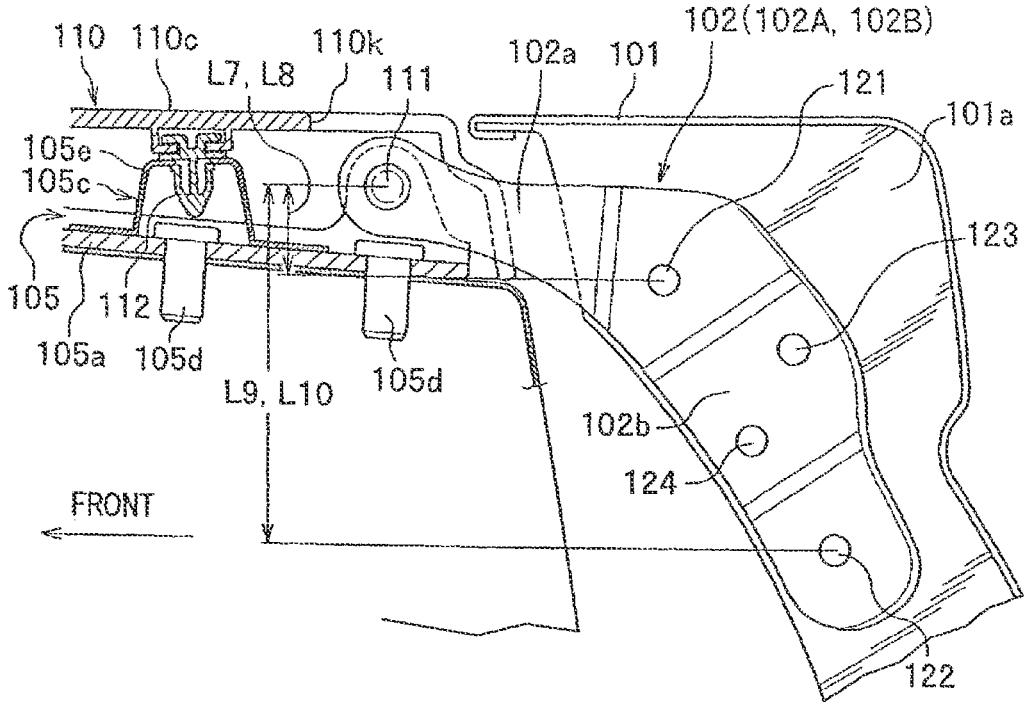
Figure 15B:
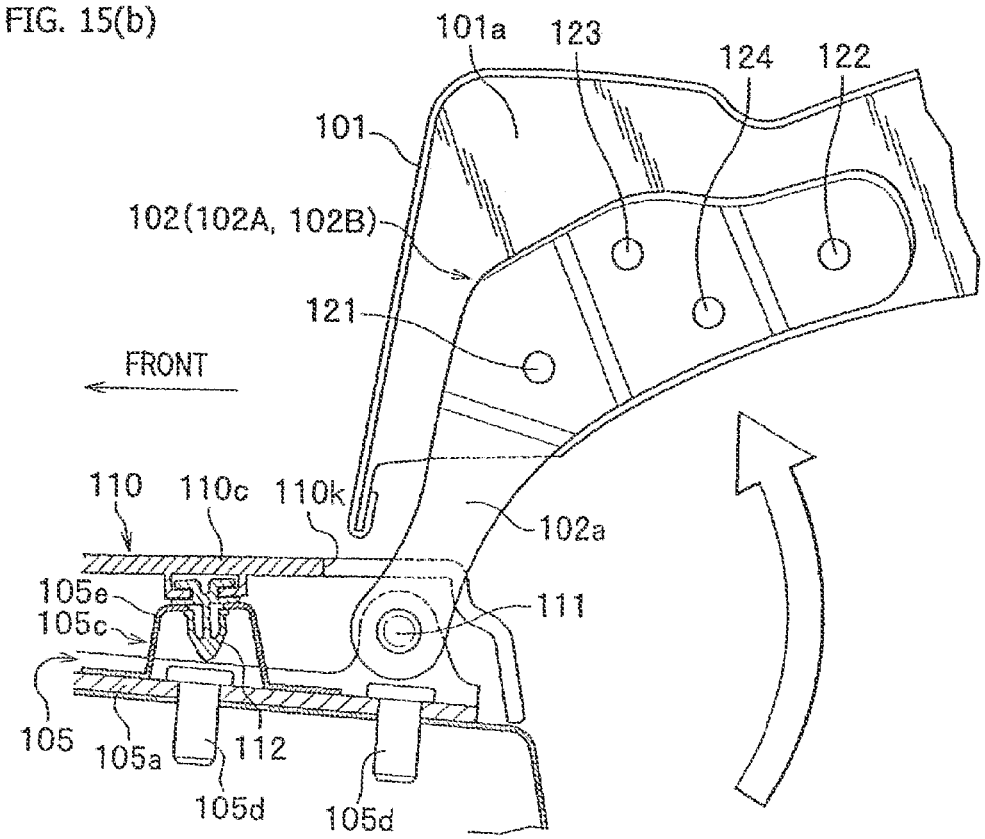
FIG. 15(b) shows a state where the tailgate is fully opened.

As shown in FIG. 15A, *the gate supporting portion 102b of each hinge member 102 includes* a gate attaching portion 121 which is positioned at the upper edge side of the tailgate 101 and a gate attaching portion 122 which is positioned downward of the gate attaching portion 121 [are provided in the gate supporting portion 102b] with the tailgate 101 fully closed. With the tailgate 101 fully closed, the gate attaching portions 121 and 122 are positioned downward of the rotating axis 111, and in the present embodiment, these components are located at the rearward side of the vehicle more than the rotating axis 111 *of the corresponding hinge member 102*. Further, in the embodiment, the gate attaching portions 121 and 122 are formed as gate attaching holes that pass through in the width direction of the vehicle, whereby the tailgate 101 is connected to and fixed at the hinge [member] *members 102,* 102 by fixing bolts (not illustrated) in the [portion] *portions* of the side plane [portion] *portions 101a,* 101a thereof via the respective gate attaching portions 121 and 122 formed as holes. Further, insertion holes 123 and 124 of bolts for provisionally fixing a fixture (not illustrated) used to attach the tailgate 101 are drilled between both the gate attaching portions 121 and 122.

The present invention is mainly featured in that, in a state where the tailgate 101 shown in FIG. 15A is closed, the positions of the gate attaching portions 121 and 122 of the hinge member 102 at the side where the open stay 103 (FIG. 13) is provided are set downward of the positions of the gate attaching portions 121 and 122 of the other hinge member 102. FIGS. 15(a)[.] *and* 15(b) are views, *partly in cross*

*section,* showing a side section of the vehicle as described above. Therefore, in [the] *these side* views, [it seems that] the pair of hinge members 102 *appear to* overlap each other. Therefore, in the following description, a description is based on the hinge member 102 shown in FIG. 15(a) (that is, this is a hinge member positioned at the left side of a vehicle, which is the hinge member at the side where the open stay 103 (FIG. 13) is not provided) being given a reference number 102A, the distance dimensions thereof are given reference numbers L7 and L9 while the hinge member 102 positioned at the deep side of the paper (that is, this is a hinge member positioned at the right side of the vehicle, which is the hinge member at the side where the open stay 103 is provided) is given a reference number 102B and the distance dimensions thereof are given reference numbers L8 and L10.

The distance dimensions L8 and L10 with respect to the perpendicular direction between the center of the rotating axis in the hinge member 102B and the respective gate attaching portions 121 and 122 (respectively indicating the center of the hole) are set to greater values than the same distance dimensions L7 and L9 in the hinge member 102A. That is, since the positions of the rotating axes 111 in both the hinge members 102A and 102B are set to the same height, the positions of the gate attaching portions 121 and 122 of the hinge member 102B are located downward of the positions of the gate attaching portions 121 and 122 of the hinge member 102A. In the present embodiment, for example, the distance dimensions L8 and L10 at the hinge member 102B side are, respectively, set to 23.1 mm and 79.4 mm while those L7 and L9 at the hinge member 102A side are, respectively, set to 22.5 min and 78.7 mm. That is, the respective hinge members 102A and 102B are formed so that dimensional differences are produced by 0.6 mm at the gate attaching portion 121 and by 0.7 mm at the gate attaching portion 122.

Thus, if, with the tailgate 101 closed, the hole positions of the gate attaching portions 121 and 122 at the hinge member 102B side are set to be lower than the hole positions of the other side, and are set to so-called left-right asymmetrical hole positions, it is possible, in an assembling process of the open stay 103, to absorb a deviation error without requiring any adjustment work, for example, by using a shim, etc., with respect to correction of the deviation between the left and right sides of the tailgate 101, which results from a reaction from the open stay 103, in detail, a deflection at the side where the open stay 103 is not provided. Therefore, when assembling the tailgate 101 in the vehicle body 104 or attaching the open stay 103, no adjustment work is required, wherein working efficiency can be improved.

Also, if, for example, the through-holes of the gate attaching portions 121 and 122 are drilled as holes which are slightly greater than the fixing bolts (not illustrated), and the hinge member 102 is composed so that it is adjustable in the longitudinal and vertical directions of the vehicle with respect to the tailgate 101, it is possible to improve the assembling accuracy of the hinge member 102 and tailgate 101 with simple work.

Also, if the hinge [member] *members 102,* 102 [is] *are* shaped so as to extend along [the plane including] *respective planes parallel to* the opening and closing directions of the tailgate 101 and the gate attaching portions 121 and 122 are formed as gate attaching holes passing through in the width direction of the vehicle, an opening and closing load operates on the hinge [member] *members 102,* 102 in [its] *their* extending plane [direction] *directions* when the tailgate 101 is opened and closed. Therefore, it is possible to secure strength against the opening and closing load. Accordingly, the outer shape and plate thickness of the hinge [member] *members 102,* 102 can be reduced, wherein weight and production costs can be reduced.

Further, by attaching the hinge [member] *members 102,* 102 to the side plane [portion] *portions 101a,* 101a of the tailgate 101, assembling work of the hinge [member] *members 102,* 102 can be carried out at a lateral position of the tailgate 101, which becomes an open space, wherein the assembling work can be easily carried out, and the detailed attaching point of [the] *each* hinge member 102 with respect to the tailgate 101 can be visually confirmed. In addition, such a structure can be obtained, in which, when the tailgate 101 is opened and closed, a force is [added] *applied* to the fixing [portion] *portions* of the hinge [member] *members 102,* 102 and the side plane [portion] *portions 101a,* 101a not in the direction along which the hinge [member] *members 102,* 102 [is] *are* peeled off from the tailgate 101 but in the shearing direction thereof. Therefore, it is possible to obtain large fixing strength by tightening means such as bolts.

Also, if such a structure is employed, in which the hinge [member] *members 102,* 102 [is] *are* provided in the [groove] *grooves 108,* 108 which [is] *are* recessed with respect to the roof panel R, it is possible to prevent the attaching [portion] *portions* of the hinge [member] *members 102,* 102 from protruding from the roof panel R. In this case, for example, as in the present embodiment, by attaching the hinge [cover] *covers 110,* 110 to the [groove] *grooves 108,* 108, it is possible to cover up the attaching portion of [the] *each* hinge member 102, wherein appearance design thereof can be improved.

Third Embodiment

Hereinafter, with reference to FIG. 16 through FIG. 24, a description is given of a rear part structure of a vehicle according to a third embodiment of the invention.

Figure 16:
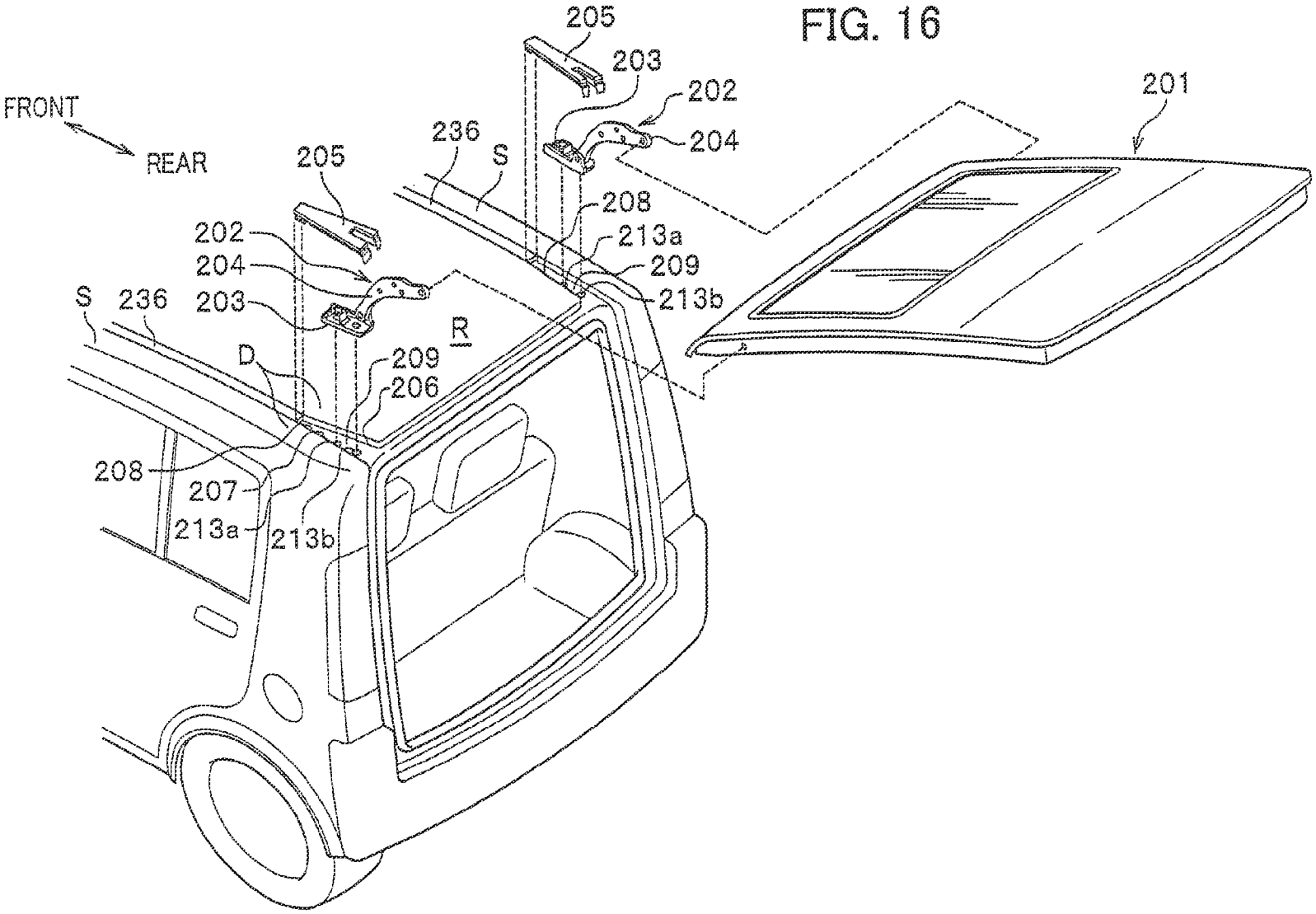
FIG. 16 is a disassembled perspective view showing component members of the tailgate of a vehicle in a third embodiment of the invention.

As shown in FIG. 16, the rear part structure of a vehicle according to the present embodiment is provided with [a] tailgate hinge [member] *members 202,* 202 at both left and right sides of the upper part in the rear opening portion of a vehicle and [a] hinge [cover] *covers 205,* 205. [The] *Each* tailgate hinge member 202 is composed of a hinge base member 203 and a gate hinge portion 204 attached to the tailgate 201, and the *corresponding* hinge cover 205 covers up the upper part of the hinge base member 203.

In the tailgate hinge [member] *members* 202, [the] *each* hinge base member 203 is caused to extend in the longitudinal direction of a vehicle at the junction portion between the [side] end side 206 of the roof panel R of a vehicle and the upper end side 207 of the *corresponding* side frame S, and is installed and fixed at the rear end bottom portion 209 of a *corresponding* groove 208 opening upwards, the section of which is channel-shaped (Refer to FIG. 16, FIG. 18, FIG. 22 and FIG. 24). A roof reinforcement, a center pillar, etc., (not illustrated) extending in the vehicle width direction are disposed inside the roof panel R, and are connected to the roof panel R and side panel S, etc., all of which constitutes the basic structure of a vehicle.

Figure 17:
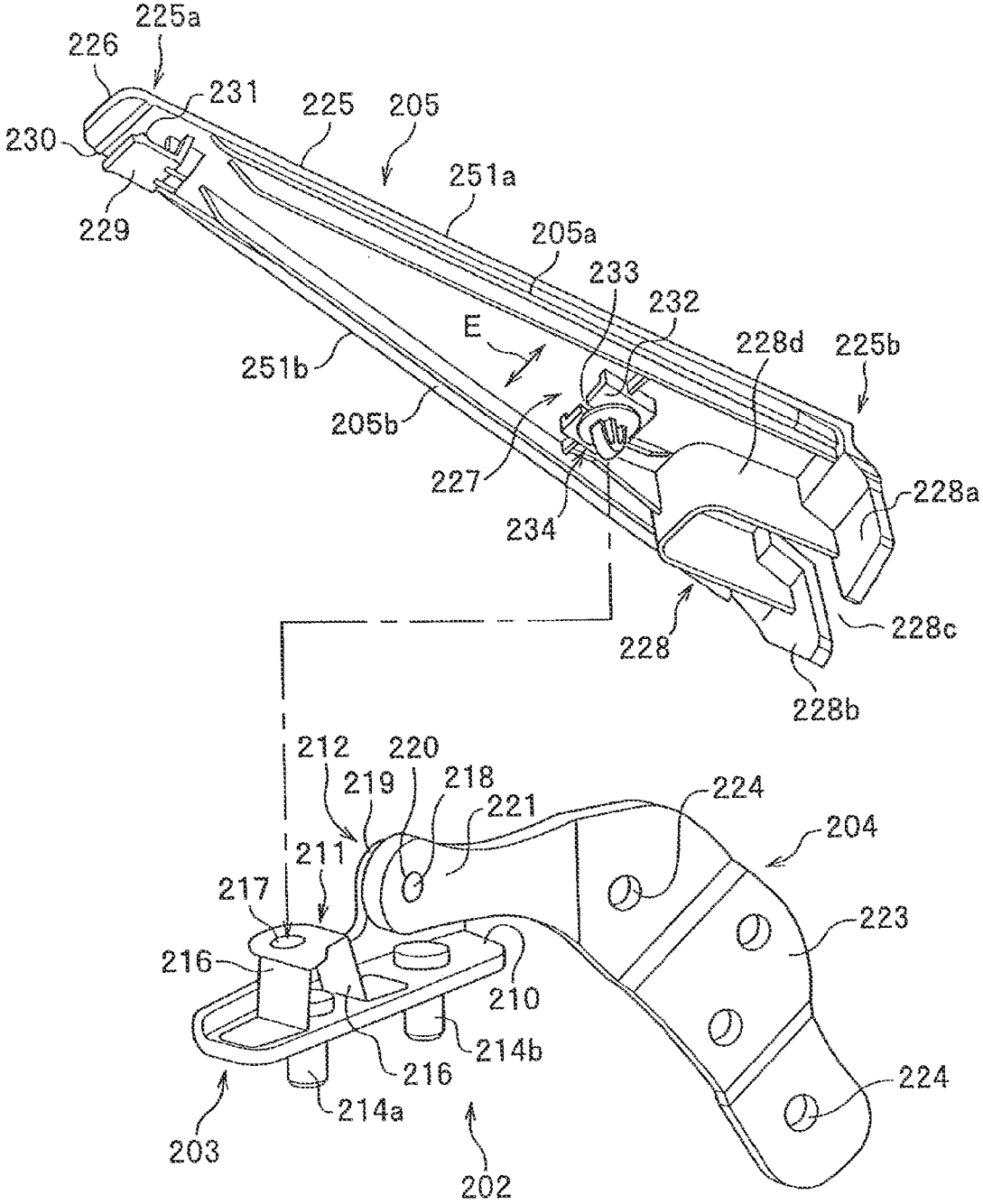
FIG. 17 is an enlarged perspective view showing the tailgate hinge member and hinge cover of the third embodiment.
Figure 18:
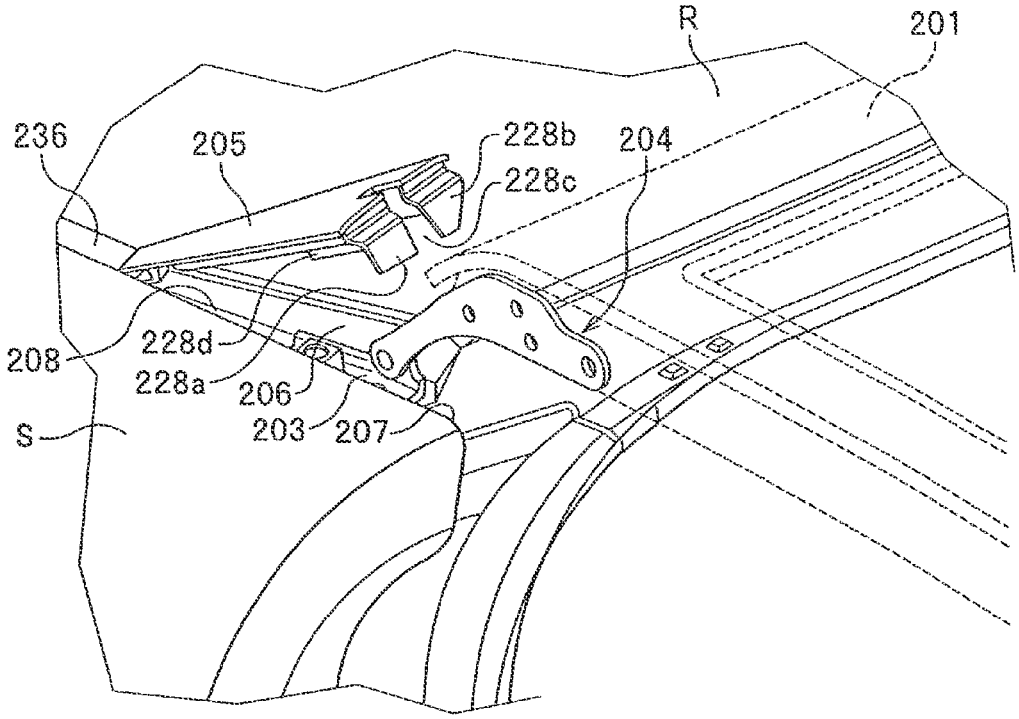
FIG. 18 is a perspective view illustrating a method for attaching the hinge cover of the third embodiment.
Figure 19:
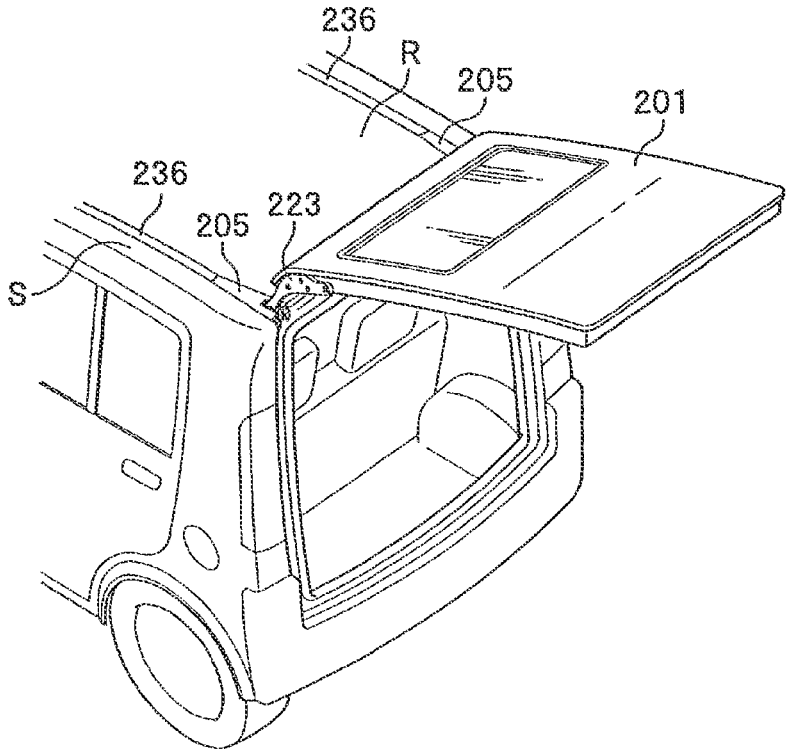
FIG. 19 is a perspective view showing the rear part structure of a vehicle according to the third embodiment of the invention.

[The] *Each* hinge base member 203 is composed, [as] *one of which is* shown in FIG. 17, of a flat plate base body 210, a cover attaching portion 211 erected on the base body 210, and a gate hinge axial supporting portion 212 erected at the side *of* the base body 210. Also, attaching pins 214a and 214b to be fitted into attaching holes 213a and 213b (Refer to FIG. 16, FIG. 20 and FIG. 22) drilled in the rear end bottom portion 209 of the *corresponding* groove 208 are provided on the base body 210 so as to protrude therefrom.

In addition, [the] *each* cover attaching portion 211 includes leg portions 216 and 216 striding the head portion of the *corresponding* attaching pin 214a and an engagement hole 217 drilled in the top surface of the [leg portion 216] *corresponding head portion 211a* (*refer to FIG. 24*). The gate hinge axial supporting portion 212 has a roughly semi-circular plate hinge supporting portion 219 on which a [rotating axis] *pivot shaft* 218 for axially supporting the gate hinge portion 204 so as to turn is provided so as to protrude therefrom.

Also, as shown in FIG. 17, the gate hinge portion 204 of [the] *each* tailgate hinge member 202 is composed of a turning arm portion 221 and a hinge body 223 connected to the turning arm portion 221. A hole 220 for turning the turning arm portion 221, into which [a rotating axis] *pivot shaft* 218 of the gate hinge axial supporting portion 212 is fitted so as to turn, is drilled in the turning arm portion 221. Attaching holes 224 and 224 for inserting bolts (not illustrated) to screw the hinge body 223 in the tailgate 201 (refer to FIG. 16 and FIG. 19) are drilled in the hinge body 223.

Further, [the] *each* hinge cover 205 is provided, as shown in FIG. 17, with a roughly triangular plate-shaped cover base body 225 having a narrow end portion 225a and a wide end portion 225b at the end part in the lengthwise direction, a moulding [braid] connection portion 226 secured at the narrow end part 225a of the cover base body 225, an engagement portion 227, and a cover portion 228 secured at the wide end portion 225b. In addition, it is preferable that ribs (positioning ribs) 205a and 205b capable of adjusting the position of the upper part outer surface F of the corresponding hinge cover 205 to the outer plane D [(Outer plane of the roof panel and outer plane of the side frame, refer to FIG. 22 and FIG. 24.)] of the rear part of a vehicle are provided along [the lengthwise direction] and protrude from [both side ends in the width direction (the direction orthogonal to the lengthwise direction)] *respective lateral sides* of the underside of the cover base body 225. *The outer plane D corresponds to the outer plane of the roof panel and the outer plane of the side frame, refer to FIG. 22 and FIG. 24.* The ribs 205a and 205b are brought into contact with the shoulder portion 206a of the side end [side] 206 of the roof panel and the shoulder portion 207a of the upper end side of the side frame as shown in FIG. 22 [and FIG. 24], wherein both [end portions] *sides* 251a and 251b in the width direction of [the] *each* hinge cover 205 are securely supported by the ribs 205a and 205b, and it becomes possible to prevent the hinge cover 205 from swaying in the width direction.

The moulding [braid] connection portion 226 is composed, as shown in FIG. 17, of the narrow end portion 225a of the cover base body 225 and an engagement tongue portion 229 bifurcated from the narrow end portion 225a and extending therefrom. A linear projection 230 for upper engagement is provided along the width direction of the narrow end portion 225a toward the engagement tongue portion 229 on the underside of the narrow end portion 225a. Also, a linear projection 231 for lower engagement is provided along the width direction of the engagement tongue portion 229 opposed to the upper engagement linear projection 230 on the upper side of the engagement tongue portion 229.

The engagement portion 227 is composed of a hollow box-shaped base 232 disposed on the underside of the cover base body 225 and a fitting member 234 fitted into a linear groove 233 drilled in the underside of the base 232. The fitting member 234 includes, as shown in FIG. 20 and FIG. 24, a neck portion 234a fitted to the linear groove 233, an engagement head portion 234b fitted to and inserted into the base 232, a flange portion 234c brought into contact with the outer surface of the base 232, and an anchor-shaped fitting portion 234d fitted into the engagement hole 217 drilled in the hinge base body 203. The linear groove 233 is drilled along the lengthwise direction of the hinge cover 205 on the underside of the base 232. The engagement head portion 234b of the fitting member 234 has a recess 234e at its middle part. The recess [234c] *234e* functions as a bending allowance for flexing or bending the edge part of the engagement head portion 234b when fitting the neck portion 234a (Refer to FIG. 24) in the linear groove 233 and attaching the fitting member 234 to the base 232.

Also, as shown in FIG. 20, the fitting portion 234d of the fitting member 234 [is roughly rectangular when being observed from the lengthwise direction of the hinge cover 205 and] is in the form of *an* anchor having pressing branch portions 235a and 235b [(Refer to FIG. 20)] bifurcated in the left and right sides when being observed from the width direction (that is, the direction orthogonal to the lengthwise direction). With such a structure, the pressing branch portions 235a and 235b are [bent, as shown in FIG. 24,] *pressed toward each other* when fitting the fitting portion 234d in the engagement hole 217 of the *corresponding* hinge base member 203, and pass through the engagement [holes] *hole* 217. After that, the head portion [21a] *211a* of the cover attaching portion 211 is placed between the pressing branch portions 235a, 235b and the flange [portions] *portion* 234c.

Further, the cover portion 228 *of each of the covers 205, 205* is composed, as shown in FIG. 17, of two cover ends 228a and 228b secured at the tip end of the wide end portion 225b of the cover base body 225 *such that the cover ends will be disposed* on opposite sides of a hinge supporting portion 219 of the *corresponding* hinge base member 203 and a *corresponding* turning arm portion 221 axially supported at the rotating axis 218 of the hinge supporting portion 219, and a curved cover 228d for accommodating the *corresponding* turning arm portion 221 so as to turn. A groove 228c, into which the turning arm portion 221 of the *corresponding gate* hinge [cover 205] *portion 204* is idly inserted, is provided between the cover ends 228a and 228b.

[In the] *With each* hinge cover 205 having the [fitting] *engagement* portion 227, by fitting the fitting portion 234d (Refer to FIG. 20) of the fitting member 234 into the engagement hole 217 of the cover attaching portion 211 [secured at one point in] *of* the hinge base member 203 of the *corresponding* tailgate hinge portion 202, and *thereby* engaging the engagement portion 227 with the cover attaching portion 211, [the] hinge cover 205 is easily assembled at the *corresponding* hinge base member 203 at one fixing point (the cover attaching portion 211).

Herein, since [the] *each* hinge cover 205 [is fitted into] *includes* the linear groove 233, [in which] *defined in* the [neck portion 234a of the fitting member 234 is drilled] *base 232* along the lengthwise direction thereof, [at the fitting member 234, the] *each* hinge cover 205 is not displaced with respect to the width direction. However, [it] *they* can be displaced *relative to the corresponding fitting member 234* along the *corresponding* linear groove 233 in the lengthwise direction. Further, as shown in FIG. 23[A](*a*), where [the] *each* hinge cover 205 is connected to the rear end of the *corresponding* roof moulding 236 fitted in the *corresponding* groove 208, the rear end of [the] *each* roof moulding 236 is held and secured between the upper engagement linear projection 230 of the moulding [braid] connection portion 226 of the *corresponding* hinge cover 205 and the lower engagement linear projection 231 thereof. For this reason,

[the] *each* moulding [braid] connection portion 226 is not displaced with respect to the width direction but can be displaced in the lengthwise direction with the rear end of the *corresponding* roof moulding 236 placed therebetween. With such a construction capable of displacing in the lengthwise direction in the engagement portion 227 and such a construction capable of displacing in the lengthwise direction in the moulding [braid] connection portion 226, since [the] *each* hinge cover 205 can be displaced relative to the extending direction of the *corresponding* roof moulding (that is, the longitudinal direction of a vehicle) after being attached to the vehicle, [the] *each* roof moulding 236 and *the corresponding* tailgate hinge member 202 can be better matched to each other.

In addition, the hinge [cover] *covers 205,* 205 [is] *are* connected to the rear end of the roof [moulding] *mouldings 236,* 236 fitted in the [groove] *grooves 208,* 208 along the longitudinal direction of a vehicle, and as shown in FIG. 22 and FIG. 24, it is preferable that [the] *each* hinge cover 205 has an outer ornamentally-designed surface formed to be roughly flush with the outer surface D of the rear part of the vehicle, whereby the upper outer surface F of [the] *each* hinge cover 205 is integrated with the outer surface D of the rear part of the vehicle, and the appearance of the vehicle can be improved.

Further, as shown in [FIG. 22 and FIG. 24] *FIGS. 22-24*, it is preferable that the outer ornamentally-designed surface (upper outer surface F) of [the] *each* hinge cover 205 is formed to be an ornamentally-designed appearance which is *substantially* continued from the outer ornamentally-designed plane 236a of the *corresponding* roof moulding 236 fitted in the *corresponding* groove 208, whereby the outer ornamentally-designed plane (upper outer surface F) of [the] *each* hinge cover 205 is *substantially* continued to the outer ornamentally-designed surface 236a (Refer to FIG. 23) of the *corresponding* roof moulding 236 fitted in the *corresponding* groove 208, thereby presenting an integrated ontamentally-designed appearance.

Hereinafter, a description is given of the rear part structure of a vehicle. Further, in the following description, the left rear part side of a vehicle is shown in FIG. 18 through FIG. 23 for description. However, the tailgate hinge [member] *members 202,* 202 and hinge [cover] *covers 205* 205 are assembled *respectively* at the right rear part [as in] *and* the left rear part.

When forming the rear part structure, first, the hinge base members 203 of the respective tailgate hinge members 202 are *fixed in* the rear end bottom portions of the grooves 208 disposed at both the upper left and right ends of the rear part opening portion of the vehicle. Thereby, as shown in FIG. 20 and FIG. 21, the gate hinge [portion] *portions 204,* 204 [is] *are* axially supported on the rotating [axis] *axes* of the hinge base [member] *members 203,* 203 so as to turn thereon, and the tailgate 201 attached to the hinge [body] *bodies 223,* 223 of the gate hinge [portion] *portions 204,* 204 [is] *are* supported so as to turn.

Next, as shown in FIG, 18, in order to cover up [the] *each* hinge base member 203, the rear part of the *corresponding* roof moulding 236 fitted into the *corresponding* groove 208 along the longitudinal direction of a vehicle is placed between the narrow end portion 225a of the moulding [braid] connection portion 226 of the *corresponding* hinge cover 205 and the engagement tongue portion 229[, and at]. *At* the same time, the fitting portion 234d of [the] *each* fitting member 234 mounted at the *corresponding* engagement portion 227 is pushed into the engagement hole 217 of the *corresponding* hinge base member 203, whereby the fitting portion 234d of [the] *each* fitting member 234 passes through the engagement hole 217 of the *corresponding* hinge base member 203 with the pressing bifurcated portions 235a and 235b [bent] *pressed toward each other* as shown in FIG. 20 [and FIG. 24], and the head portion [of the] 211a of the *corresponding* cover attaching portion 211 is placed between the pressing bifurcated portions 235a, 235b and the flange portion 234c. Thereby, [the] *each* fitting portion 234d is fitted in the *corresponding* engagement hole 217.

[At this time, as] *As* shown in FIG. 20, [the] *each* hinge cover 205 can be easily assembled at one fixing point [(the cover attaching portion 211)] of the *corresponding* cover attaching portion 211 *and thereby* secured at one point in the hinge base member 203 of the *corresponding* tailgate hinge member 202. At this time, [the] hinge supporting portion 219 of the *corresponding* hinge base member 203 and the turning arm portion 221 of the *corresponding* gate hinge portion 204 pivotally supported on the hinge supporting portion 219 by the [rotating axis] *pivot shaft* 218 are accommodated in the curved cover 228d of the *corresponding* hinge cover 205 as shown in FIG. 22 (that is, the sectional view taken along the arrow line C-C in. FIG. 20), and the turning arm portion 221 idly moves vertically in the groove 228c secured between the cover ends 228a and 228b of the *corresponding* hinge cover 205.

Figure 23B:
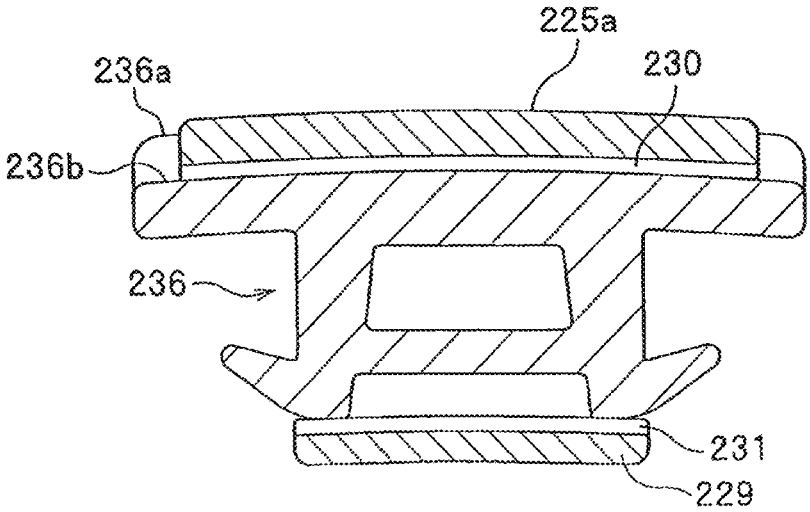
FIG. 23(b) is a sectional view taken along the arrow line [E-E] *23*(*b*)-*23*(*b*) in FIG. 23(a)

On the other hand, in the moulding [braid] connection portion 226 of [the] *each* hinge cover 205, as shown in FIG. 23(a) and FIG. 23(b) (that is, the sectional view taken along the arrow line [E-E] *23(b)-23(b)* in FIG. 23(a), the rear end [237] of the *corresponding* roof moulding 236 placed between the narrow end portion 225a and the engagement tongue portion 229 is held and secured between the upper engagement linear projection 230 and the lower engagement linear projection 231. At this time, it is preferable that, [in the] *for each* roof moulding 236, the upper engagement linear projection 230 is engaged with the upper surface of the shoulder portion 236b secured at the rear end upper portion of the *corresponding* roof moulding 236, the side plane 236c of the shoulder portion 236b is brought into contact with the tip end of the narrow end portion 225a of the moulding [braid] connection portion 226, and the rear end of the *corresponding* roof moulding 236 and the tip end of the *corresponding* hinge cover 205 [continuously] form a *substantially continuous* flush surface.

As described above, as shown in FIG. 19, a rear part structure of a vehicle in which the tailgate 201 is attached so as to be freely opened and closed by the tailgate hinge members 202 disposed at both upper left and right ends of the rear part opening portion of the vehicle is thus constructed. At this time, the tailgate hinge member 202 is composed of a hinge base member 203 fixed on the rear end bottom portion of the groove 208 disposed between the roof panel R and the side frame S and the gate hinge portion 204 attached to the tailgate 201 and simultaneously axially supported on the hinge base member 203 so as to freely turn. The upper part of the hinge base member 203 is covered up by the hinge cover 205 fitted into the groove 208, wherein the outer appearance of the vehicle can be ornamentally improved.

In the above, some embodiments of the invention were described. However, it is a matter of course that the shapes, layouts and quantities of the respective components are subject to change within a scope not deviating from the spirit of the invention.

What is claimed is:

[1. A rear part structure of a vehicle, which includes a groove formed in a longitudinal direction of the vehicle at a junction portion of a roof panel and a side frame of the vehicle and in which a tailgate to be installed at a rear part of the vehicle is attached by a hinge; wherein the hinge comprises: a hinge base member attached into the groove; and a gate hinge member attached to the tailgate which is pivotally attached to the hinge base member.]

[2. A rear part structure of a vehicle according to claim 1, wherein the gate hinge member extends along a direction where the tailgate is opened and closed.]

[3. A rear part structure of a vehicle according to claim 2, wherein the gate hinge member is attached to a side plane portion of the tailgate.]

[4. A rear part structure of a vehicle according to claim 2, wherein the gate hinge member is adjustable in at least one of the longitudinal direction and the vertical direction of the vehicle with respect to the tailgate.]

[5. A rear part structure of a vehicle according to claim 1, wherein an open stay for fixing the tailgate is provided in the vicinity of an attaching portion of the gate hinge member.]

[6. A rear part structure of a vehicle according to claim 1, wherein the hinge base member is covered by a hinge cover continuously extending from a roof moulding secured in the groove.]

[7. A rear part structure of a vehicle according to claim 6, wherein the hinge cover includes a front portion which is connected to a rear end of a roof moulding fitted in the groove, and an outer surface of the hinge cover is substantially flush with an outer surface of a rear part of the vehicle.]

[8. A rear part structure of a vehicle according to claim 7, wherein the outer surface of the hinge cover has a design appearance which is continuous with that of an outer surface of a roof moulding fitted in the groove.]

[9. A rear part structure of a vehicle according to claim 8, wherein the hinge cover is connected to a rear end of the roof moulding so as to allow a relative displacement of the hinge cover with respect to a longitudinal direction of the roof moulding.]

[10. A rear part structure of a vehicle according to claim 6, wherein the hinge cover has positioning ribs along a longitudinal direction thereof and at both ends in a width direction of an underside thereof, the positioning ribs being brought into contact with the side edge of the roof panel and the upper edge of the side frame and allowing an adjustment of a position of the hinge cover.]

[11. A rear part structure of a vehicle according to claim 10, wherein the hinge cover includes an engagement portion engaged with and secured at a cover attaching portion of the hinge base member.]

12. A method for attaching a tailgate hinge member *and a hinge cover*, comprising the steps of:

fixing a hinge base member of a tailgate hinge member on a rear end bottom portion of a groove, which extends longitudinally of a vehicle at a junction portion between a side edge of a roof panel and an upper edge of a side frame, and which opens upwards to have a channel-shaped section;

thereafter connecting one end of *a* hinge cover for covering the hinge base member to a rear end of a roof moulding fitted in the groove; and engaging the other end of the hinge cover with a cover attaching portion of the hinge base member.

* * * * *